(12) United States Patent
Saito et al.

(10) Patent No.: US 9,300,862 B2
(45) Date of Patent: Mar. 29, 2016

(54) CONTROL APPARATUS AND CONTROL METHOD

(71) Applicant: CANON KABUSHIKI KAISHA, Tokyo (JP)

(72) Inventors: Junichi Saito, Kawasaki (JP); Koichi Fukuda, Tokyo (JP); Hideaki Takamiya, Yokohama (JP); Yoshihito Tamaki, Yokohama (JP); Yuki Yoshimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/677,065

(22) Filed: Apr. 2, 2015

(65) Prior Publication Data

US 2015/0296128 A1 Oct. 15, 2015

(30) Foreign Application Priority Data

Apr. 15, 2014 (JP) ................................. 2014-083337

(51) Int. Cl.
  *H04N 5/232* (2006.01)
  *G03B 13/36* (2006.01)
  *G02B 7/34* (2006.01)
  *H04N 5/225* (2006.01)
  *G02B 7/28* (2006.01)

(52) U.S. Cl.
  CPC ............ *H04N 5/23212* (2013.01); *G02B 7/285* (2013.01); *G02B 7/34* (2013.01); *G03B 13/36* (2013.01); *H04N 5/2254* (2013.01)

(58) Field of Classification Search
  None
  See application file for complete search history.

(56) References Cited

U.S. PATENT DOCUMENTS

| | | | | |
|---|---|---|---|---|
| 7,283,737 B2 * | 10/2007 | Ohmura | ........... | G02B 7/34 396/111 |
| 7,873,267 B2 * | 1/2011 | Kusaka | ........... | G02B 7/36 348/345 |
| 8,094,999 B2 * | 1/2012 | Ohnishi | ........... | G02B 7/38 396/113 |
| 8,405,760 B2 * | 3/2013 | Yamasaki | ........... | G03B 3/10 348/280 |
| 8,576,329 B2 * | 11/2013 | Takamiya | ........... | G02B 7/34 348/349 |
| 8,633,992 B2 * | 1/2014 | Tsukada | ........... | G02B 7/38 348/208.12 |
| 8,767,118 B2 * | 7/2014 | Yamasaki | ........... | G03B 3/10 348/349 |
| 8,860,873 B2 | 10/2014 | Tamaki | | |
| 8,872,962 B2 | 10/2014 | Fukuda | | |
| 9,019,424 B2 | 4/2015 | Kimura et al. | | |

(Continued)

FOREIGN PATENT DOCUMENTS

JP 2013-25246 A 2/2013

OTHER PUBLICATIONS

U.S. Appl. No. 14/657,250, filed Mar. 13, 2015.

*Primary Examiner* — Michael Osinski
(74) *Attorney, Agent, or Firm* — Fitzpatrick, Cella, Harper & Scinto

(57) ABSTRACT

A control apparatus includes a first calculation unit configured to calculate a first defocus amount by a phase-difference detection method using a first signal and a second signal, a second calculation unit configured to calculate a second defocus amount based on a contrast evaluation value of a synthesized signal, an instruction unit configured to give an instruction of focus control, and a control unit configured to perform the focus control in response to the instruction of the focus control by the instruction unit, the synthesized signal is a signal obtained by relatively shifting phases of the first and second signals and synthesizing the first and second signals, and the control unit refers to the second defocus amount prior to the first defocus amount in the focus control.

16 Claims, 12 Drawing Sheets

(56) References Cited

U.S. PATENT DOCUMENTS

| | | | | |
|---|---|---|---|---|
| 9,025,074 B2* | 5/2015 | Kishi | H04N 5/23212 | 348/222.1 |
| 9,106,827 B2* | 8/2015 | Fukuda | H04N 5/23212 | |
| 2002/0036257 A1* | 3/2002 | Yamashita | H04N 5/23212 | 250/208.1 |
| 2004/0090550 A1* | 5/2004 | Park | H04N 9/045 | 348/350 |
| 2004/0125229 A1* | 7/2004 | Aoyama | H04N 5/23212 | 348/345 |
| 2004/0202461 A1* | 10/2004 | Nakahara | G02B 7/285 | 396/104 |
| 2005/0001924 A1* | 1/2005 | Honda | H04N 5/23212 | 348/348 |
| 2005/0280735 A1* | 12/2005 | Nakahara | H04N 5/23212 | 348/345 |
| 2007/0102619 A1* | 5/2007 | Kusaka | G02B 7/285 | 250/201.2 |
| 2007/0132877 A1* | 6/2007 | Bok | G02B 7/36 | 348/345 |
| 2007/0154200 A1* | 7/2007 | Utagawa | H04N 9/045 | 396/111 |
| 2007/0206937 A1* | 9/2007 | Kusaka | G02B 7/102 | 396/89 |
| 2007/0269197 A1* | 11/2007 | Ide | G02B 7/34 | 396/125 |
| 2008/0198257 A1* | 8/2008 | Morimoto | G03B 13/00 | 348/345 |
| 2008/0240701 A1* | 10/2008 | Kusaka | G02B 7/36 | 396/104 |
| 2008/0259202 A1* | 10/2008 | Fujii | H04N 5/3696 | 348/345 |
| 2008/0302947 A1* | 12/2008 | Utagawa | G02B 7/32 | 250/201.8 |
| 2009/0135289 A1* | 5/2009 | Kusaka | G02B 3/0056 | 348/345 |
| 2010/0013947 A1* | 1/2010 | Oikawa | H04N 5/23212 | 348/222.1 |
| 2010/0026877 A1* | 2/2010 | Koh | G02B 7/36 | 348/345 |
| 2010/0149389 A1* | 6/2010 | Goto | G02B 7/34 | 348/280 |
| 2010/0150539 A1* | 6/2010 | Kusaka | G03B 13/28 | 396/125 |
| 2010/0232776 A1* | 9/2010 | Ohnishi | H04N 5/23212 | 396/104 |
| 2010/0309365 A1* | 12/2010 | Inoue | G02B 7/102 | 348/345 |
| 2011/0001869 A1* | 1/2011 | Hamano | G03B 13/18 | 348/347 |
| 2011/0013894 A1* | 1/2011 | Takaiwa | G03B 17/00 | 396/48 |
| 2011/0102596 A1* | 5/2011 | Kotani | G06T 7/0065 | 348/159 |
| 2011/0205423 A1* | 8/2011 | Tsukada | G02B 7/38 | 348/345 |
| 2011/0228145 A1* | 9/2011 | Kimura | G02B 7/102 | 348/247 |
| 2011/0305445 A1* | 12/2011 | Yasuda | H04N 5/23212 | 396/78 |
| 2012/0033115 A1* | 2/2012 | Fujii | G02B 5/201 | 348/280 |
| 2012/0044406 A1* | 2/2012 | Shimoda | G02B 7/365 | 348/345 |
| 2012/0092545 A1* | 4/2012 | Sugawara | G02B 7/285 | 348/345 |
| 2012/0133813 A1* | 5/2012 | Nagano | H04N 5/3696 | 348/311 |
| 2012/0133821 A1* | 5/2012 | Takaiwa | H04N 5/23212 | 348/345 |
| 2012/0147245 A1* | 6/2012 | Iijima | H04N 5/23212 | 348/333.11 |
| 2012/0147255 A1* | 6/2012 | Yasuda | G03B 3/10 | 348/352 |
| 2012/0169917 A1* | 7/2012 | Isobe | G02B 7/08 | 348/345 |
| 2012/0176532 A1* | 7/2012 | Hara | G03B 13/36 | 348/352 |
| 2012/0249846 A1* | 10/2012 | Nishio | H01L 27/14603 | 348/294 |
| 2012/0301044 A1* | 11/2012 | Nakada | H04N 5/23229 | 382/255 |
| 2012/0321203 A1* | 12/2012 | Yamashita | G06T 5/005 | 382/224 |
| 2013/0021499 A1* | 1/2013 | Ui | G03B 13/36 | 348/238 |
| 2013/0021517 A1* | 1/2013 | Ui | H04N 5/3696 | 348/245 |
| 2013/0063571 A1* | 3/2013 | Ishii | G06T 15/205 | 348/47 |
| 2013/0182900 A1* | 7/2013 | Ishii | H04N 5/23212 | 382/103 |
| 2013/0235253 A1* | 9/2013 | Onuki | H04N 5/23212 | 348/349 |
| 2013/0242172 A1* | 9/2013 | Hamano | H04N 5/23212 | 348/349 |
| 2013/0258170 A1 | 10/2013 | Tamaki | | |
| 2013/0329120 A1* | 12/2013 | Hiasa | H04N 5/23212 | 348/345 |
| 2013/0335547 A1* | 12/2013 | Ogawa | H04N 7/18 | 348/78 |
| 2014/0002706 A1* | 1/2014 | Ishii | G02B 7/08 | 348/308 |
| 2014/0049666 A1* | 2/2014 | Tsutsumi | H04N 5/23212 | 348/239 |
| 2014/0118610 A1* | 5/2014 | Ohara | H04N 5/23212 | 348/349 |
| 2014/0139725 A1* | 5/2014 | Nagano | H04N 5/23212 | 348/354 |
| 2014/0146221 A1 | 5/2014 | Kimura et al. | | |
| 2014/0176784 A1* | 6/2014 | Hongu | H04N 5/23212 | 348/349 |
| 2014/0192220 A1 | 7/2014 | Kimura et al. | | |
| 2014/0192249 A1* | 7/2014 | Kishi | H04N 5/23212 | 348/349 |
| 2014/0198245 A1* | 7/2014 | Kunugi | H04N 5/23212 | 348/349 |
| 2014/0204241 A1* | 7/2014 | Ohara | H04N 5/243 | 348/223.1 |
| 2014/0267839 A1* | 9/2014 | Nishimaki | H04N 5/367 | 348/246 |
| 2014/0320711 A1* | 10/2014 | Fukuda | H04N 5/23212 | 348/294 |
| 2014/0332661 A1 | 11/2014 | Fukuda | | |
| 2014/0340543 A1* | 11/2014 | Nakada | H04N 5/23229 | 348/239 |
| 2014/0340567 A1 | 11/2014 | Fukuda | | |
| 2014/0354781 A1* | 12/2014 | Matsuyama | H04N 5/23212 | 348/49 |
| 2015/0062389 A1* | 3/2015 | Takeuchi | H04N 5/23212 | 348/273 |
| 2015/0109409 A1* | 4/2015 | Isogai | H04N 13/0022 | 348/43 |
| 2015/0109515 A1* | 4/2015 | Kobuse | H04N 5/23212 | 348/349 |
| 2015/0130988 A1* | 5/2015 | Uenishi | H04N 5/23212 | 348/349 |
| 2015/0296129 A1* | 10/2015 | Ishikawa | H04N 5/378 | 348/349 |

* cited by examiner

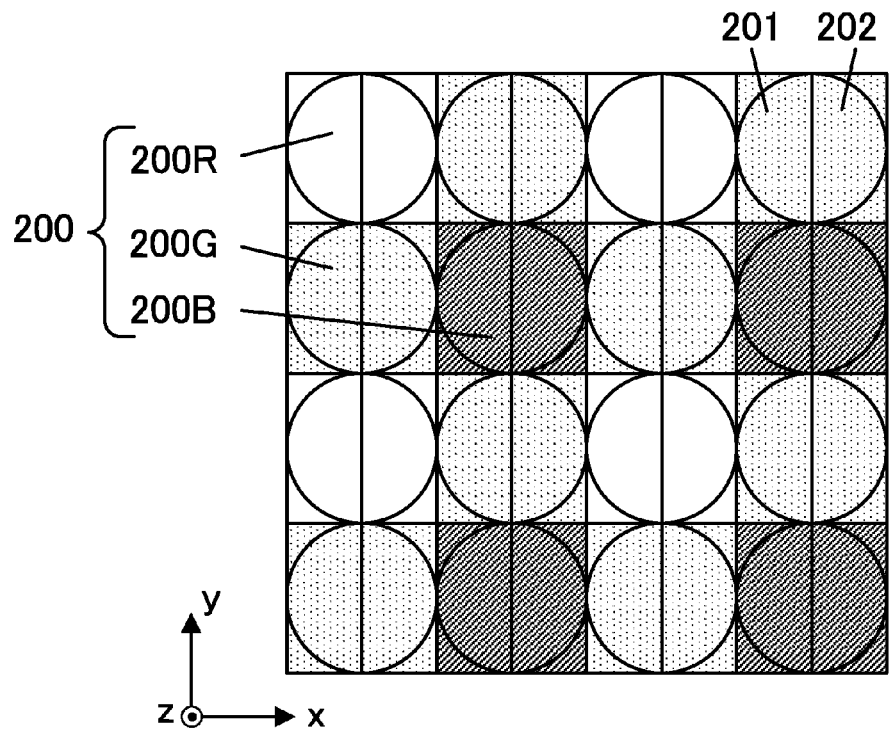
FIG. 2
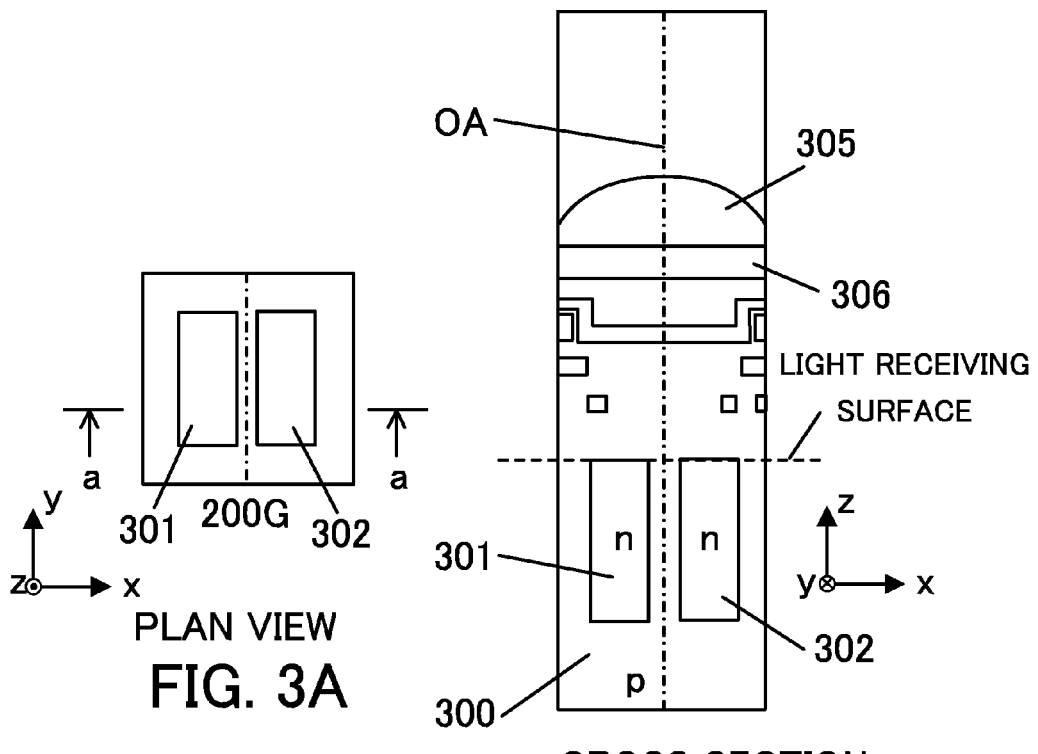
PLAN VIEW
FIG. 3A
a-a CROSS SECTION
FIG. 3B

CONTROL APPARATUS AND CONTROL METHOD

BACKGROUND OF THE INVENTION

1. Field of the Invention

The present invention relates to a control apparatus that performs focus control based on a signal output from an image pickup element.

2. Description of the Related Art

Previously, focus detection (phase difference AF) by an imaging-plane phase-difference detection method using focus detection signals from an image pickup element and focus detection (contrast AF) by a contrast method using imaging signals from the image pickup element have been known.

Japanese Patent Laid-open No. 2013-25246 discloses an image pickup apparatus which performs focus control by using a phase difference AF by a correlation calculation unit and a contrast AF by a contrast evaluation unit. The image pickup apparatus disclosed in Japanese Patent Laid-open No. 2013-25246 first performs the phase difference AF based on a correlation value by the correlation calculation unit up to a neighborhood of an in-focus position. After performing the phase difference AF, the image pickup apparatus performs the contrast AF by the contrast evaluation unit when a contrast evaluation value obtained by a shift addition image becomes available.

The correlation calculation unit as disclosed in Japanese Patent Laid-open No. 2013-25246 needs to correspond to a larger amount of defocus (shift amount from an in-focus position), and therefore a filtering process is performed to detect a signal with a lower spatial frequency band relative to the contrast evaluation unit in many cases. Accordingly, in-focus determination positions obtained by both of the contrast evaluation unit and the correlation calculation unit have a displacement (shift amount) due to the difference of the bands of filters.

Therefore, in the configuration disclosed in Japanese Patent Laid-open No. 2013-25246, when an instruction of start of AF is given again after the AF control to the in-focus position or the completion of shooting an image, the focus detection by the phase difference AF is performed by using the correlation calculation unit again even when the change of the defocus state of an object is small. In this case, the in-focus position may be misidentified by the displacement due to the difference of the bands of the filters as described above and thus a focus lens may be unnecessarily driven, and as a result, there is a possibility that high-speed and high-accuracy focus detection is prevented.

SUMMARY OF THE INVENTION

The present invention provides a control apparatus and a control method that are capable of performing high-speed and high-accuracy focus control.

A control apparatus as one aspect of the present invention includes a first calculation unit configured to calculate a first defocus amount by a phase-difference detection method using a first signal and a second signal, a second calculation unit configured to calculate a second defocus amount based on a contrast evaluation value of a synthesized signal, an instruction unit configured to give an instruction of focus control, and a control unit configured to perform the focus control in response to the instruction of the focus control by the instruction unit, the synthesized signal is a signal obtained by relatively shifting phases of the first and second signals and synthesizing the first and second signals, and the control unit refers to the second defocus amount prior to the first defocus amount in the focus control.

A control method as another aspect of the present invention includes the steps of calculating a first defocus amount by a phase-difference detection method using a first signal and a second signal, calculating a second defocus amount based on a contrast evaluation value of a synthesized signal, giving an instruction of focus control, and performing the focus control in response to the instruction of the focus control, the synthesized signal is a signal obtained by relatively shifting phases of the first and second signals and synthesizing the first and second signals, and the focus control is performed by referring to the second defocus amount prior to the first defocus amount.

Further features and aspects of the present invention will become apparent from the following description of exemplary embodiments with reference to the attached drawings.

BRIEF DESCRIPTION OF THE DRAWINGS

FIG. 2 is a diagram of illustrating a pixel array in this embodiment.

FIGS. 3A and 3B are diagrams of illustrating a pixel structure in this embodiment.

DESCRIPTION OF THE EMBODIMENTS

Exemplary embodiments of the present invention will be described below with reference to the accompanied drawings.

[Overall Configuration of Image Pickup Apparatus]

Figure 1:
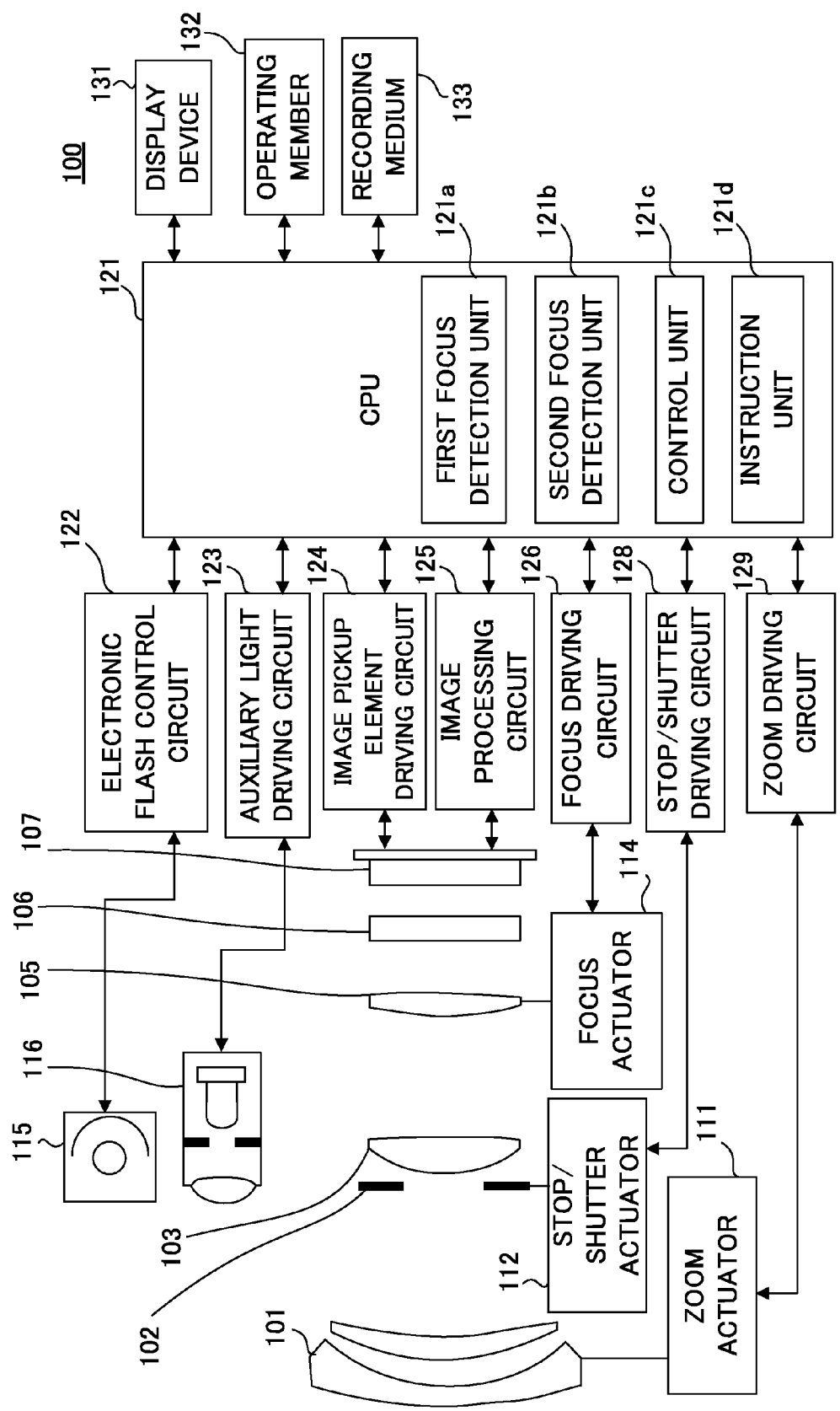
FIG. 1 is a block diagram of an image pickup apparatus in this embodiment.

First of all, referring to FIG. 1, a schematic configuration of an image pickup apparatus in an embodiment of the present invention will be described. FIG. 1 is a block diagram of an image pickup apparatus 100 (camera) in this embodiment. The image pickup apparatus 100 of this embodiment is a digital camera system that includes a camera body and an interchangeable lens (imaging optical system or image pickup optical system) removably attached to the camera body. This embodiment, however, is not limited to this, and can also be applied to an image pickup apparatus in which a camera body and a lens are integrated with each other.

A first lens unit 101 is disposed at the forefront side (object side) of a plurality of lens units that constitute an imaging lens (imaging optical system), and it is held on a lens barrel so as to be movable back and forth in a direction of an optical axis OA (optical axis direction). A shutter with a stop 102 (aperture stop) adjusts its opening diameter to control a light intensity when shooting an image, and it also functions as a shutter to control an exposure time when shooting a still image. A second lens unit 103 moves integrally with the shutter with the stop 102 back and forth in the optical axis direction, and it has a zoom function that performs a magnification-varying operation in conjunction with the back-and-forth motion of the first lens unit 101. A third lens unit 105 is a focus lens unit that moves back and forth in the optical axis direction to perform focusing (focus operation). An optical low-pass filter 106 is an optical element that reduces a false color or a moire of a shot image.

An image pickup element 107 performs a photoelectric conversion of an object image (optical image) formed via the imaging optical system, and for example it includes a CMOS sensor or a CCD sensor, and its peripheral circuit. As the image pickup element 107, for example a two-dimensional single plate color sensor is used which includes a primary color mosaic filter having a Bayer array formed on a light receiving pixel having m pixels in a lateral direction and having n pixels in a vertical direction in an on-chip configuration.

A zoom actuator 111 rotationally moves (drives) a cam cylinder (not illustrated) to move the first lens unit 101 and the second lens unit 103 along the optical axis direction to perform the magnification-varying operation. The stop/shutter actuator 112 controls the opening diameter of the shutter with the stop 102 to adjust the light intensity (shooting light intensity) and also controls the exposure time in shooting the still image. A focus actuator 114 moves the third lens unit 105 in the optical axis direction to perform the focusing.

An electronic flash 115 is an illumination device to be used for illuminating the object. As the electronic flash 115, a flash illumination device that includes a xenon tube or an illumination device that includes an LED (light emitting diode) continuously emitting light. An AF auxiliary lighting unit 116 projects an image of a mask having a predetermined opening pattern onto the object via a projection lens. In this configuration, a focus detection capability for a dark object or an object with a low contrast can be improved.

The CPU 121 is a controller (control unit) that governs various controls of the image pickup apparatus 100. The CPU 121 includes a processor, a ROM, a RAM, an A/D converter, a D/A converter, a communication interface circuit, and the like. The CPU 121 reads out and executes a predetermined program stored in the ROM to drive various circuits of the image pickup apparatus 100 and to perform a series of operations such as focus detection (AF), image shooting, image processing, or recording.

In this embodiment, the CPU 121 includes a first focus detection unit 121a (first calculation unit), a second focus detection unit 121b (second calculation unit), a control unit 121c, and an instruction unit 121d. The first focus detection unit 121a calculates a first defocus amount Def1 based on a first evaluation value relating to a plurality of signals obtained from a plurality of pixels (first pixel and second pixel) of the image pickup element 107. The second focus detection unit 121b calculates a second defocus amount Def2 based on a second evaluation value relating to an addition signal (synthesized signal or combined signal) of the plurality of signals. The instruction unit 121d gives an instruction of focus control in response to an instruction by a user via the operating member 132. The control unit 121c performs the focus control in response to the instruction of the focus control by the instruction unit 121d. In this embodiment, the control unit 121c refers to the second defocus amount Def2 prior to the first defocus amount Def1 to perform focus control. In this embodiment, the first focus detection unit 121a, the second focus detection unit 121b, and the control unit 121c are configured on the same circuit board.

An electronic flash control circuit 122 performs a lighting control of the electronic flash 115 in synchronization with the image shooting operation. An auxiliary light driving circuit 123 performs a lighting control of the AF auxiliary lighting unit 116 in synchronization with the focus detection operation. An image pickup element driving circuit 124 controls the image shooting operation of the image pickup element 107 and also performs the A/D conversion of the obtained image signal to send it to the CPU 121. An image processing circuit 125 (image processing unit) performs processings such as a γ (gamma) conversion, a color interpolation, or a JPEG (Joint Photographic Experts Group) compression on the image data output from the image pickup element 107.

A focus driving circuit 126 (focus drive unit) drives the focus actuator 114 based on the focus detection result to move the third lens unit 105 along the optical axis direction to control a focus shift amount (defocus amount). A stop/shutter driving circuit 128 drives the stop/shutter actuator 112 to control the opening diameter of the shutter with the stop 102. A zoom driving circuit 129 (zoom drive unit) drives the zoom actuator 111 in response to a zoom operation by a user.

A display device 131 (display unit) includes for example an LCD (liquid crystal display). The display device 131 displays information relating to a shooting mode of the image pickup apparatus 100, a preview image before shooting an image, a confirmation image after shooting the image, an in-focus state displaying image in the focus detection, or the like. An operating member 132 (operating unit) includes a power switch, a release (shooting trigger) switch, a zoom operation switch, an shooting mode selecting switch, and the like. The release switch is a two-step switch in a half-depression state (in a state where SW1 is ON) and in a full-depression state (in a state where SW2 is ON). A recording medium 133 is for example a flash memory that is removable from the image pickup apparatus 100, and it records the shot image (image data).

[Structure of Image Pickup Element]

Subsequently, referring to FIGS. 2, 3A, and 3B, a pixel array and a pixel structure of the image pickup element 107 in this embodiment will be described. FIG. 2 is a diagram of illustrating the pixel array of the image pickup element 107. FIGS. 3A and 3B are diagrams of illustrating the pixel structure of the image pickup element 107, and FIGS. 3A and 3B illustrate a plan view of a pixel 200G of the image pickup element 107 (view in a +z direction) and a cross-sectional view along line a-a in FIG. 3A (view in a −z direction), respectively.

FIG. 2 illustrates the pixel array (array of imaging pixels) of the image pickup element 107 (two-dimensional CMOS sensor) in a range of 4 columns×4 rows. In this embodiment, each of the imaging pixels (pixels 200R, 200G, and 200B) includes two focus detection pixels 201 and 202 (two subpixels for pupil division). Therefore, FIG. 2 illustrates the array of the focus detection pixels in a range of 8 columns×4 rows.

As illustrated in FIG. 2, a pixel group 200 of 2 columns×2 rows includes the pixels 200R, 200G, and 200B in a Bayer array. In other words, in the pixel group 200, the pixel 200R having a spectral sensitivity for R (red) is disposed at the upper left, the pixels 200G having a spectral sensitivity for G (green) are disposed at the upper right and at the lower left, and the pixel 200B having a spectral sensitivity for B (blue) is disposed at the lower right. Each of the pixels 200R, 200G, and 200B (each imaging pixel) includes a focus detection pixel 201 (first focus detection pixel or first pixel portion) and a focus detection pixel 202 (second focus detection pixel or second pixel portion) arrayed in 2 columns×1 row. The focus detection pixel 201 is a pixel which receives a light beam passing through a first pupil region of the imaging optical system. The focus detection pixel 202 is a pixel which receives a light beam passing through a second pupil region of the imaging optical system.

As illustrated in FIG. 2, the image pickup element 107 includes a lot of imaging pixels of 4 columns×4 rows (focus detection pixels of 8 columns×4 rows) arranged on a surface, and it outputs an imaging signal (focus detection signal). In the image pickup element 107 of this embodiment, a period P of the pixels (imaging pixels) is 4 µm, and the number N of the pixels (imaging pixels) is horizontally 5575 columns×vertically 3725 rows=approximately 20.75 million pixels. In the image pickup element 107, a period $P_{AF}$ of the focus detection pixels in a column direction is 2 µm, and the number $N_{AF}$ of the focus detection pixels is horizontally 11150 columns×vertically 3725 rows=approximately 41.50 million pixels.

As illustrated in FIG. 3B, the pixel 200G of this embodiment is provided with a microlens 305 at a light receiving surface side of the pixel to condense incident light. The microlens 305 is disposed at a position away from the light receiving surface by a predetermined distance in a z-axis direction (direction of an optical axis direction OA). In the pixel 200G, a photoelectric conversion portion 301 and a photoelectric conversion portion 302 are formed by dividing the pixel into $N_H$ (two divisions) in an x direction and into $N_V$ (one division) in a y direction. The photoelectric conversion portion 301 and the photoelectric conversion portion 302 correspond to the first focus detection pixel 201 and the second focus detection pixel 202, respectively.

Each of the photoelectric conversion portions 301 and 302 is configured as a photodiode having a p-i-n structure that includes a p-type layer and an n-type layer and an intrinsic layer between the p-type layer and the n-type layer. If necessary, the intrinsic layer can be omitted and a photodiode with a p-n junction may be applicable. The pixel 200G (each pixel) is provided with a color filter 306 between the microlens 305 and each of the photoelectric conversion portions 301 and 302. If necessary, a spectral transmittance of the color filter 306 can be changed for each subpixel (focus detection pixel), or alternatively the color filter may be omitted.

As illustrated in FIGS. 3A and 3B, the light entering the pixel 200G is condensed by the microlens 305 and is dispersed by the color filter 306, and then the dispersed lights are received by the photoelectric conversion portions 301 and 302. In each of the photoelectric conversion portions 301 and 302, pairs of an electron and a hole are generated depending on a light receiving amount and they are separated in a depletion layer, and then the electrons with a negative charge are accumulated in the n-type layer. On the other hand, the holes are excluded to the outside of the image pickup element 107 through the p-type layer connected to a constant voltage source (not illustrated). The electrons accumulated in the n-type layers of the photoelectric conversion portions 301 and 302 are transferred to an electrostatic capacitance (FD) through a transfer gate to be converted to a voltage signal.

Figure 4:
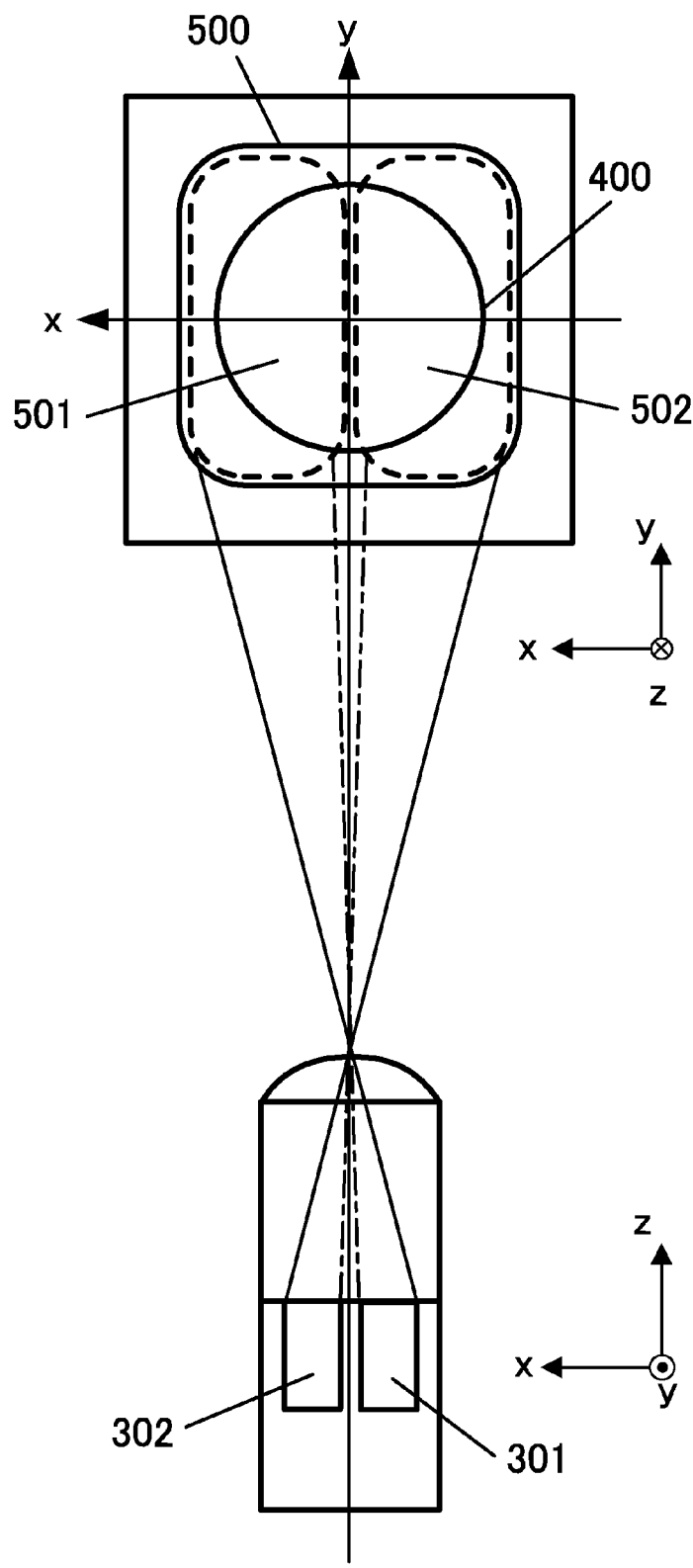
FIG. 4 is a diagram of explaining an image pickup element and a pupil dividing function in this embodiment.

Subsequently, referring to FIG. 4, a pupil dividing function of the image pickup element 107 will be described. FIG. 4 is a diagram of explaining the pupil dividing function of the image pickup element 107, and illustrates a situation of the pupil division in one pixel portion. FIG. 4 illustrates a cross-sectional view of the section A-A of the pixel structure illustrated in FIG. 3A when seen in the +y direction and an exit pupil plane of the imaging optical system. In FIG. 4, in order to correspond to a coordinate axis of the exit pupil plane, the x-axis and y-axis in the cross-sectional view are inverted with respect to the x-axis and y-axis of FIGS. 3A and 3B.

In FIG. 4, a pupil partial region 501 (first pupil partial region) for the focus detection pixel 201 (first focus detection pixel) has approximately a conjugate relation, via the microlens 305, with respect to the light receiving surface of the photoelectric conversion portion 301 whose center of gravity is displaced (decentered) in the −x direction. Thus, the pupil partial region 501 represents a pupil region which is capable of receiving light by the focus detection pixel 201. The center of gravity of the pupil partial region 501 for the focus detection pixel 201 is displaced (decentered) in the +x direction on a pupil plane. A pupil partial region 502 (second pupil partial region) for the focus detection pixel 202 (second focus detection pixel) has approximately a conjugate relation, via the microlens 305, with respect to the light receiving surface of the photoelectric conversion portion 302 whose center of gravity is displaced (decentered) in the +x direction. Thus, the pupil partial region 502 represents a pupil region which is capable of receiving light by the focus detection pixel 202. The center of gravity of the pupil partial region 502 for the focus detection pixel 202 is displaced (decentered) in the −x direction on the pupil plane. A pupil region 500 is a pupil region that is capable of receiving light over the entire region of the pixel 200G when the photoelectric conversion elements 301 and 302 (focus detection pixels 201 and 202) are entirely combined.

Figure 5:
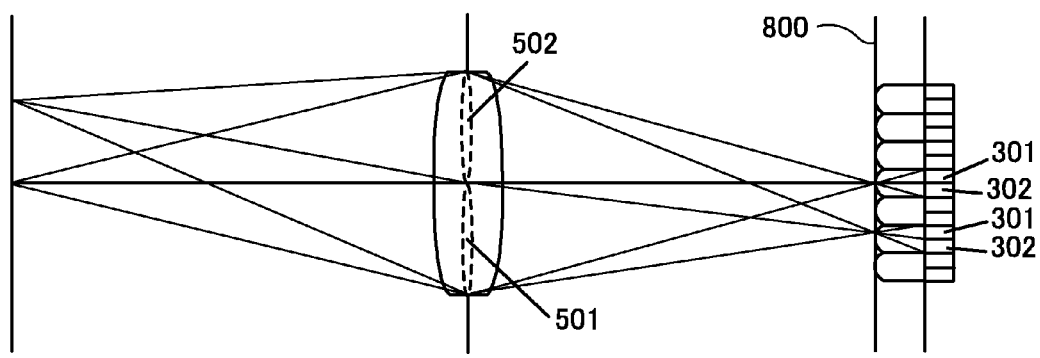
FIG. 5 is a diagram of explaining the image pickup element and the pupil dividing function in this embodiment.

FIG. 5 is a diagram of explaining the image pickup element 107 and the pupil dividing function. The light beams passing through the pupil partial regions 501 and 502 different from each other in the pupil region of the imaging optical system enter each pixel of the image pickup element 107, i.e. an imaging plane 800 of the image pickup element 107, at angles different from each other, and are received by the focus detection pixels 201 and 202 which have been divided into 2×1. This embodiment describes an example in which the pupil region is divided into two in a horizontal direction, but is not limited to this and the pupil division may be performed in a vertical direction if necessary.

As described above, in this embodiment, the image pickup element 107 shares one microlens, and includes a plurality of pixels that receives a plurality of light beams passing through regions (first pupil partial region and second pupil partial region) different from each other in a pupil of the imaging optical system (imaging lens). The image pickup element 107 includes, as the plurality of pixels, a first pixel (first focus detection pixel, for example the focus detection pixel 201) and a second pixel (second focus detection pixel, for example the focus detection pixel 202). The first focus detection pixel receives a light beam passing through the first pupil partial region (pupil partial region 501), and the second focus detection pixel receives a light beam passing through the second pupil partial region (pupil partial region 502) which is different from the first pupil partial region of the imaging optical system. In this embodiment, the imaging pixel is a pixel which is constituted by combining the first and second focus detection pixels, and it receives a light beams passing through the pupil region including the first and second pupil partial regions. However, this embodiment is not limited to this. The imaging pixel, the first focus detection pixel, and the second focus detection pixel can be constituted as pixels different from each other such that the first and second focus detection pixels are partially (discretely) arranged in part of the array of the imaging pixels.

In this embodiment, a first focus signal is generated by collecting light receiving signals of the focus detection pixels 201 (first focus detection pixels) of the image pickup element 107 and a second focus signal is generated by collecting light receiving signals of the focus detection pixels 202 (second focus detection pixels) of the image pickup element 107 to perform the focus detection. Furthermore, signals of the focus detection signals 201 and 202 are added (combined) for each pixel such that imaging signals (shot image) with a resolution of the number N of effective pixels can be generated.

[Relation Between Defocus Amount and Image Shift Amount]

Next, the relation between a defocus amount of the focus detection signal (first signal or first focus detection signal) output from the focus detection pixel 201 and the focus detection signal (second signal or second focus detection signal) output from the focus detection pixel 202 of the image pickup element 107, and an image shift amount will be described.

Figure 6:
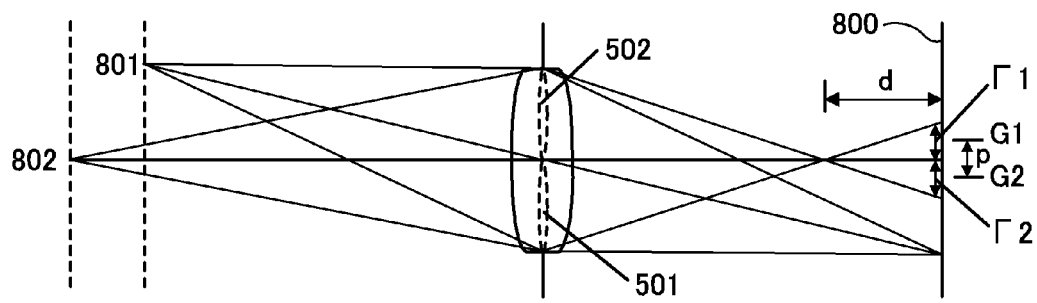
FIG. 6 is a diagram of a relationship between a defocus amount and an image shift amount in this embodiment.

FIG. 6 is a diagram of illustrating the relation between the defocus amount and the image shift amount. In FIG. 6, the image pickup element 107 is disposed on the imaging plane 800, and similarly to FIGS. 4 and 5, a situation in which the exit pupil of the imaging optical system is divided into two pupil partial regions 501 and 502 is illustrated.

A defocus amount d is defined such that a distance from an imaging position of an object to the imaging plane 800 is |d|, a front focus state in which the imaging position is located at an object side relative to the imaging plane 800 is a negative sign (d<0), and a rear focus state in which the imaging position is located at a side opposite to the object relative to the imaging plane 800 is a positive sign (d>0). In an in-focus state in which the imaging position of the object is on the imaging plane 800 (in-focus position), the defocus amount d=0 is satisfied. In FIG. 6, an object 801 which is in the in-focus state (d=0) and an object 802 which is in the front focus state (d<0) are illustrated. The front focus state (d<0) and the rear focus state (d>0) are collectively referred to as a defocus state (|d|>0).

In the front focus state (d<0), the light beam that has passed through the pupil partial region 501 (or pupil partial region 502) of light beams from the object 802 is condensed once. Then, the light beam spreads to a width Γ1 (Γ2) around a center position of gravity G1 (G2) of the light beam, and a blurred image is formed on the imaging plane 800. The blurred image is received by the focus detection pixel 201 (focus detection pixel 202) constituting each pixel arrayed in the image pickup element 107, and the first focus detection signal (second focus detection signal) is generated. Therefore, the first focus detection signal (second focus detection signal) is recorded as a blurred object image in which the object 802 is blurred to have the width Γ1 (Γ2) at the center position of gravity G1 (G2) on the imaging plane 800. The blurred width Γ1 (Γ2) of the object image roughly increases in proportion as the absolute value |d| of the defocus amount d increases. Similarly, an absolute value |p| of an image shift amount p of the object image between the first and second focus detection signals (i.e. which is equivalent to a difference of the center positions of gravity of the light beams (G1-G2)) roughly increases as the absolute value |d| of the defocus amount d increases. This is similarly applied to the rear focus state (d>0), but an image shift direction of the object image between the first and second focus detection signals is opposite to that in the front focus state.

Accordingly, in this embodiment, the absolute value of the image shift amount between the first and second focus detection signals increases as the absolute value of the defocus amount of the first and second focus detection signals or the imaging signals obtained by adding the first and second focus detection signals increases.

[Focus Detection]

In this embodiment, focus detection (first focus detection) by a phase-difference detection method and focus detection (second focus detection) by a method based on a refocus principle (by a refocus method) are performed by using the relationship between the defocus amount of the first and second focus detection signals and the image shift amount. The first focus detection is used to perform focusing from a large defocus state to a small defocus state. The second focus detection is used to perform the focusing from the small defocus state to a neighborhood of a best in-focus position.

[Focus Detection by Phase-Difference Detection Method (First Focus Detection)]

Next, the focus detection (first focus detection) by the phase-difference detection method in this embodiment will be described. When the focus detection by the phase-difference detection method is performed, the CPU 121 (first focus detection unit 121*a*) of the image pickup apparatus 100 relatively shifts the first and second focus detection signals to calculate a correlation amount (first evaluation value) that represents a degree of coincidence of the signals. Then, the CPU 121 calculates the image shift amount based on a shift amount in which the correlation (degree of coincidence) is good. There is a relation in which the absolute value of the image shift amount between the first and second focus detection signals increases as the absolute value of the defocus amount of the imaging signal increases, and accordingly the CPU 121 converts the image shift amount to the defocus amount (first defocus amount) to perform the focus detection.

Figure 7:
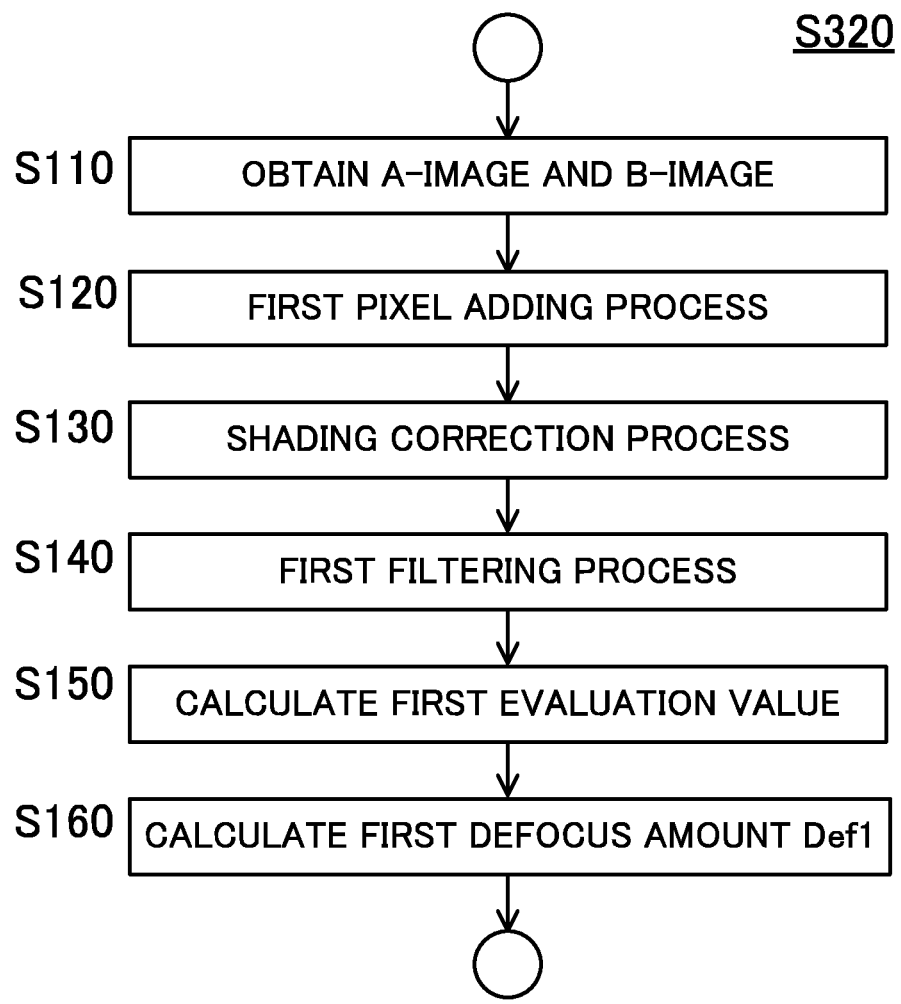
FIG. 7 is a flowchart of illustrating a focus detection process by a phase difference method (first focus detection process) in this embodiment.

Referring to FIG. 7, a flow of a focus detection process (first focus detection process) by the phase-difference detection method will be described. FIG. 7 is a flowchart of illustrating the first focus detection process, and it corresponds to step S320 in FIG. 19 described below. Each step of FIG. 7 is performed mainly by the CPU 121 (first focus detection unit 121*a*) and the image processing circuit 125.

First of all, at step S110, the CPU 121 (first focus detection unit 121*a*) sets a focus detection region from among an effective pixel region of the image pickup element 107 to perform the focusing. Then, the CPU 121 and the image processing circuit 125 generate (obtain) the first focus detection signal (A-image signal) based on a light receiving signal (output signal) of the first focus detection pixel included in the focus detection region. Furthermore, the CPU 121 and the image processing circuit 125 generate (obtain) the second focus detection signal (B-image signal) based on a light receiving signal (output signal) of the second focus detection pixel included in the focus detection region.

Subsequently, at step S120, the image processing circuit 125 performs a three-pixel adding process in a column direction to suppress a signal data amount for each of the first and second focus detection signals. Furthermore, the image processing circuit 125 performs a Bayer (RGB) adding process to convert a color signal (RGB signals) to a luminance signal (Y signal). In this embodiment, these two adding processes are collectively referred to as a first pixel adding process.

Figures 8A, 8B, 8C:
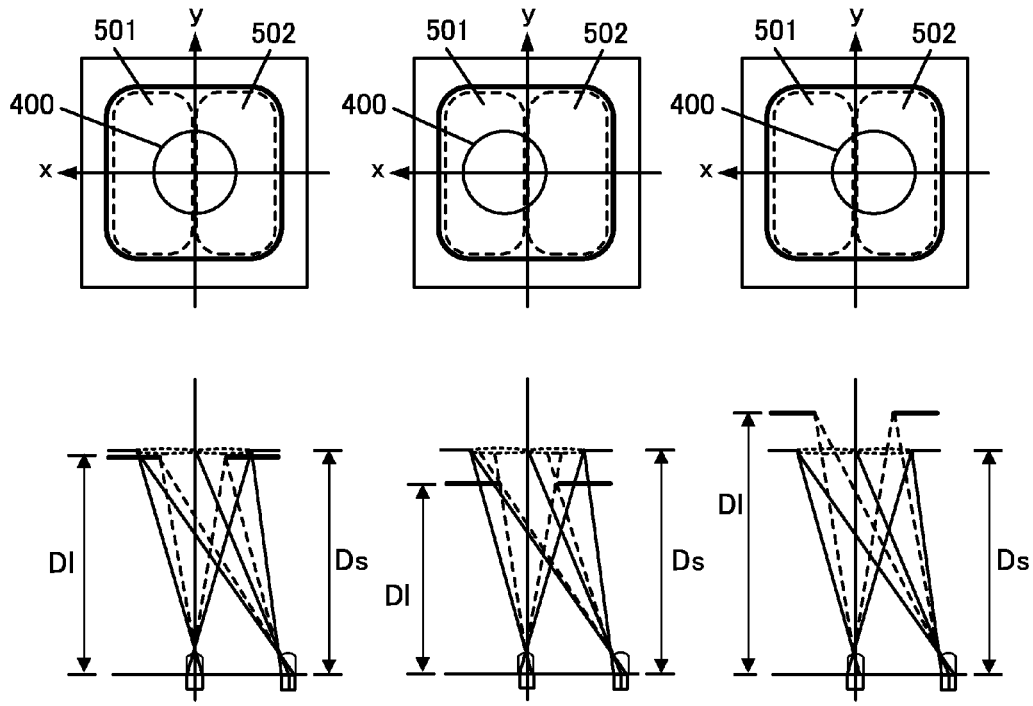
FIGS. 8A to 8C are diagrams of explaining a shading caused by a pupil shift of a first focus detection signal and a second focus detection signal in this embodiment.

Subsequently, at step S130, the CPU 121 and the image processing circuit 125 perform a shading correction process (optical correction process) for each of the first and second focus detection signals. Referring to FIGS. 8A to 8C, a shading caused by a pupil shift of the first and second focus detection signals will be described. FIGS. 8A to 8C are diagrams of explaining the shading caused by the pupil shift of the first and second focus detection signals. Specifically, FIGS. 8A to 8C illustrate a relation of the pupil partial region 501 of the focus detection pixel 201 at a peripheral image height of the image pickup element 107, the pupil partial region 502 of the focus detection pixel 202, and the exit pupil 400 of the imaging optical system.

FIG. 8A illustrates a case in which an exit pupil distance D1 of the imaging optical system (distance between the exit pupil 400 and the imaging plane of the image pickup element 107) is equal to a set pupil distance Ds of the image pickup element 107. In this case, the exit pupil 400 of the imaging optical system is approximately equally divided.

On the other hand, as illustrated in FIG. 8B, when the exit pupil distance Dl of the imaging optical system is shorter than the set pupil distance Ds of the image pickup element 107, a pupil shift is generated between the exit pupil 400 of the imaging optical system and an entrance pupil of the image pickup element 107 at the peripheral image height of the image pickup element 107. Therefore, the exit pupil 400 of the imaging optical system is unequally divided. Similarly, as illustrated in FIG. 8C, when the exit pupil distance Dl of the imaging optical system is longer than the set pupil distance Ds of the image pickup element 107, the pupil shift is generated between the exit pupil 400 of the imaging optical system and the entrance pupil of the image pickup element 107 at the peripheral image height of the image pickup element 107. Therefore, the exit pupil 400 of the imaging optical system is unequally divided. Intensities of the first and second focus detection signals are unequal to each other as the pupil division is unequal at the peripheral image height. Accordingly, the shading occurs in which one of the intensities of the first and second focus detection signals increases and the other decreases.

At step S130 of FIG. 7, the CPU 121 generates a first shading correction coefficient of the first focus detection signal and a second shading correction coefficient of the second focus detection signal according to an image height of the focus detection region, an F-number of the imaging lens (imaging optical system), and an exit pupil distance. Then, the image processing circuit 125 multiplies the first focus detection signal by the first shading correction coefficient and multiplies the second focus detection signal by the second shading correction coefficient to perform the shading correction processes (optical correction processes) of the first and second focus detection signals.

When performing the focus detection (first focus detection) by the phase-difference detection method, the CPU 121 detects (calculates) the defocus amount (first defocus amount) based on the correlation (degree of coincidence) between the first and second focus detection signals. When the shading by the pupil shift occurs, the correlation (degree of coincidence) between the first and second focus detection signals may be decreased. Therefore, in this embodiment, when performing the focus detection by the phase-difference detection method, it is preferred that the CPU 121 performs the shading correction process (optical correction process) in order to improve the correlation (degree of coincidence) between the first and second focus detection signals to improve a focus detection performance.

Figure 9:
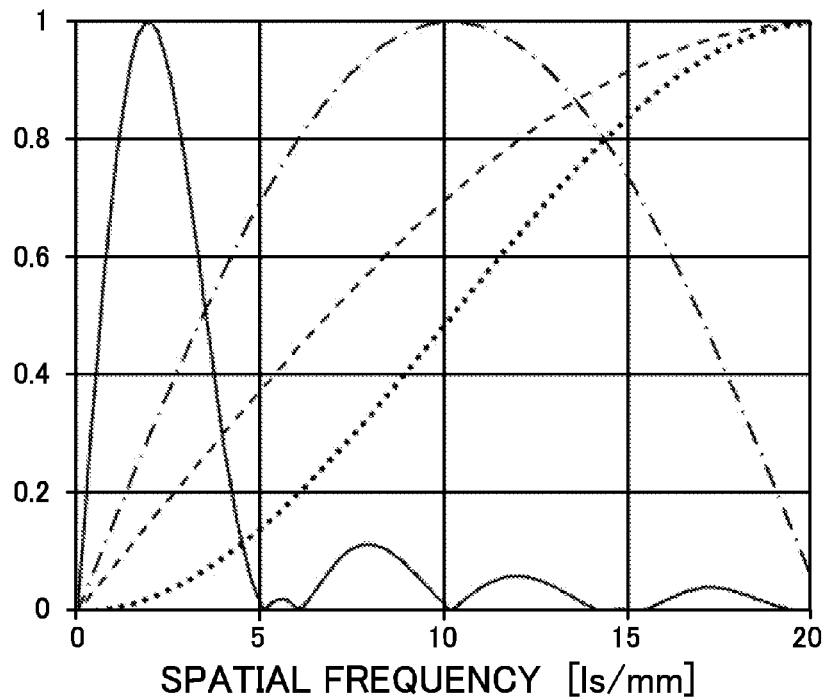
FIG. 9 is a diagram of explaining a first filtering process in this embodiment.

Subsequently, at step S140, the CPU 121 and the image processing circuit 125 perform a first filtering process on the first and second focus detection signals. FIG. 9 is a diagram of explaining the first filtering process, and illustrates an example of a passband, with a solid line, in the first filtering process of this embodiment. In this embodiment, the focus detection in a large defocus state is performed by the focus detection (first focus detection) by the phase-difference detection method. Therefore, the passband in the first filtering process includes a low frequency band. If necessary in performing the focusing from the large defocus state to the small defocus state, as indicated by a dashed-dotted line in FIG. 9, the passband of the first filtering process during the first focus detection process may be adjusted to be moved to a higher frequency band according to the defocus state.

Subsequently, at step S150, the CPU 121 (image processing circuit 125) performs a shift process (first shift process) that relatively shifts the first and second focus detection signals on which the first filtering process has been performed in a pupil dividing direction. Then, the CPU 121 calculates a correlation amount (first evaluation value) that represents the degree of coincidence of the signals.

In this embodiment, k-th first and second focus detection signals in which the first filtering process have been performed are denoted by A(k) and B(k) respectively, a range of the number k corresponding to the focus detection region is denoted by W, a shift amount by the first shift process is denoted by $s_1$, and a shift range of the shift amount $s_1$ is denoted by Γ1. In this case, a correlation amount COR (first evaluation value) is represented as the following expression (1).

$$COR(s_1) = \sum_{k \in W} |A(k) - B(k - s_1)|, s_1 \in \Gamma 1 \qquad (1)$$

The CPU 121 performs the shift process (first shift process) by the shift amount $s_1$ such that the k-th first focus detection signal A(k) and the $(K-s_1)$-th second focus detection signal $B(K-s_1)$ correspond to each other, and subtracts the signal $B(K-s_1)$ from the signal A(k) to generate a shift subtraction signal. Then, the CPU 121 calculates absolute values of the generated shift subtraction signals and a sum of the absolute values for the number k within the range W corresponding to the focus detection region to calculate the correlation amount COR ($s_1$) (first evaluation value). If necessary, the correlation amount (first evaluation value) calculated for each row may be added over a plurality of rows for each shift amount.

Subsequently, at step S160, the CPU 121 performs a sub-pixel calculation for the correlation amount (first evaluation value) to calculate a real-valued shift amount which indicates a minimum correlation amount to obtain the image shift amount p1. Then, the CPU 121 multiplies the image shift amount p1 by a conversion coefficient K1 (first conversion coefficient) according to the image height of the focus detection region, the F-number of the imaging lens (imaging optical system), and the exit pupil distance to detect (calculate) a first defocus amount Def1.

As described above, in this embodiment, the CPU 121 performs the focus detection (first focus detection) by the phase-difference detection method to perform the first filtering process and the first shift process on each of the first and second focus detection signals. Then, the CPU 121 calculates the correlation amount based on the signals on which the first filtering process and the first shift process have been performed, and detects (calculates) the first defocus amount Def1 based on the calculated correlation amount.

In the image pickup element 107 of this embodiment, the light beam which is received by the focus detection pixel (first or second focus detection pixel) is different from the light beam which is received by the imaging pixel. Therefore, the influence on the focus detection pixel (focus detection signal) caused by each aberration (such as spherical aberration, astigmatism, and coma aberration) of the imaging optical system is different from the influence on the imaging pixel (imaging signal). When the aperture value (F-number) of the imaging optical system is small (bright), the difference of these light beams (influence) is larger. Therefore, when the aperture value of the imaging optical system is small (bright), a difference may be generated between the in-focus position calculated by using the focus detection process by the phase-difference detection method (i.e. position where the first defocus amount Def1 is zero) and the best in-focus position of the imaging signal (i.e. position where MTF of the imaging signal is peaked). Particularly, when the aperture value of the imaging optical system is not greater than a predetermined aperture value, there is a possibility that the focus detection accuracy of the focus detection process by the phase-difference detection method may be decreased.

Figure 10:
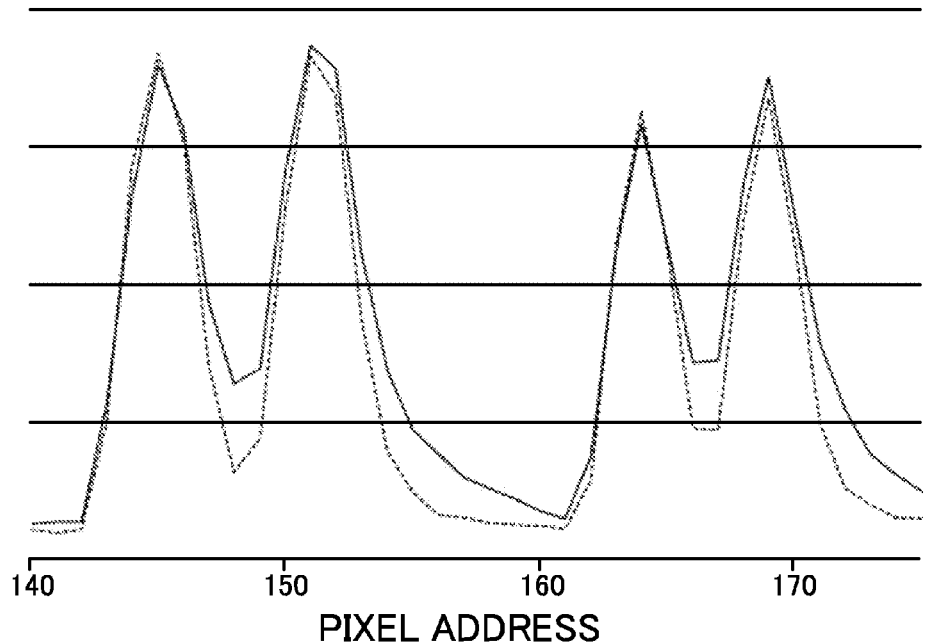
FIG. 10 is an example of the first focus detection signal and the second focus detection signal in this embodiment.

FIG. 10 is an example of the first and second focus detection signals, and illustrates the first focus detection signal (dashed line) and the second focus detection signal (solid line) at the best in-focus position of the imaging signal at the peripheral image height of the image pickup element 107. In FIG. 10, with respect to the best in-focus position of the imaging signal, shapes (signal waveforms) of the first and second focus detection signals are different from each other due to the influence of each aberration of the imaging optical system.

Figure 11:
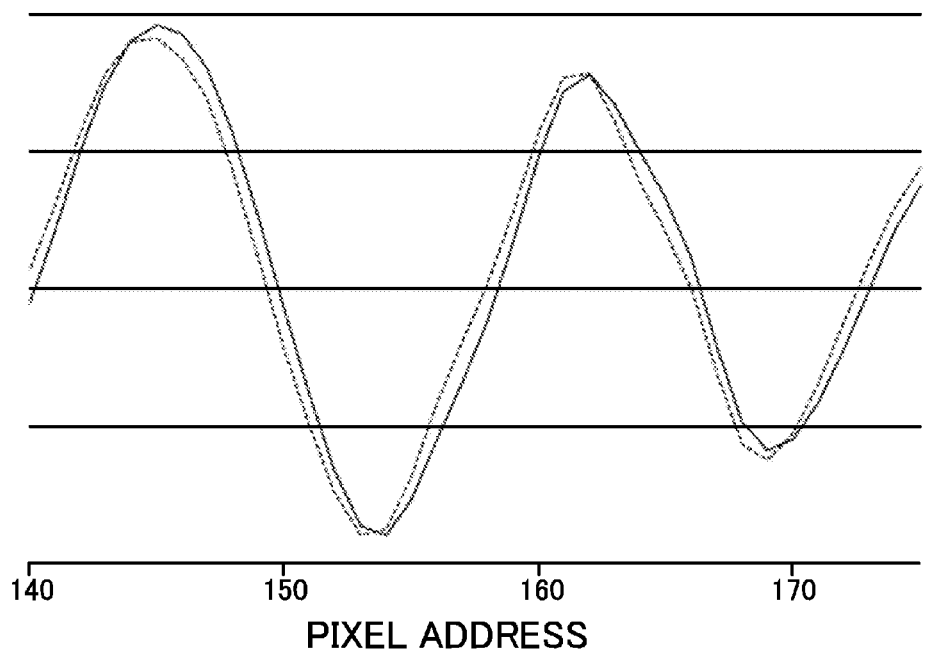
FIG. 11 is an example of the first focus detection signal and the second focus detection signal on which a shading correction process and the first filtering process have been performed.

FIG. 11 illustrates the first focus detection signal (dashed line) and the second focus detection signal (solid line) on which the shading correction process and the first filtering process have been performed. In FIG. 11, with respect to the best in-focus state of the imaging signal, the image shift amount p1 between the first and second focus detection signals is not zero. Therefore, a difference is generated between the in-focus position calculated by the focus detection process (first focus detection process) by the phase-difference detection method and the best in-focus position of the imaging signal.

Figure 12:
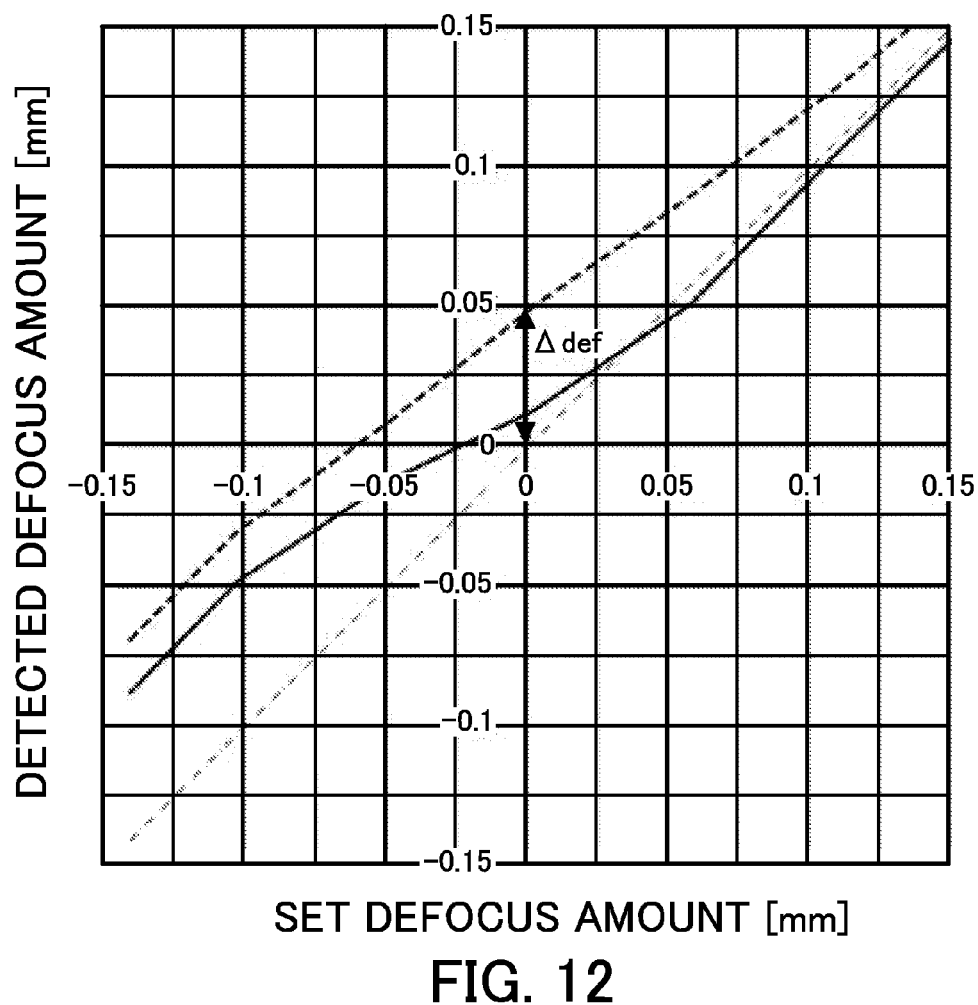
FIG. 12 is an example of a first defocus amount and a second defocus amount in this embodiment.

FIG. 12 is an example of the first defocus amount Def1 in this embodiment. In FIG. 12, a dashed line indicates the first defocus amount Def1 by the focus detection process (first focus detection process) by the phase-difference detection method in this embodiment. A horizontal axis and a vertical axis in FIG. 12 indicate a set defocus amount and a detected defocus amount, respectively. The first and second focus detection signals illustrated in FIG. 10 are first and second focus detection signals when the set defocus amount of FIG. 12 is zero [mm]. As illustrated in FIG. 12, at the best in-focus position where the set defocus amount is zero, the first defocus amount Def1 (detected defocus amount) by the first defocus detection process is offset by approximately 50 μm toward the rear focus side. Thus, a difference by approximately 50 μm is generated between the best in-focus position and the in-focus position (detected in-focus position) calculated by the first focus detection process.

The image pickup apparatus 100 of this embodiment is capable of reducing a difference between the in-focus-position (detected in-focus position) calculated based on the focus detection signal and the best in-focus position of the imaging signal to perform highly-accurate focus detection. Therefore, the image pickup apparatus 100 performs the focus detection (second focus detection) by the refocus method that is capable of performing the highly-accurate focus detection at the neighborhood of the best in-focus position of the imaging optical system, in addition to the focus detection (first focus detection) by the phase-difference detection method.

[Focus Detection by Refocus Method (Second Focus Detection)]

Next, the focus detection (second focus detection) by the refocus method in this embodiment will be described. When performing the focus detection by the refocus method, the CPU 121 (second focus detection unit 121b) of the image pickup apparatus 100 relatively shifts (phases of) the first and second focus detection signals and adds (synthesizes or combines) them to generate a shift addition signal (synthesized signal or refocus signal). Then, the CPU 121 calculates a contrast evaluation value of the generated shift addition signal (refocus signal). The CPU 121 estimates the position (MTF peak position) where the MTF of the imaging signal is peaked based on the contrast evaluation value to detect (calculate) a defocus amount (second defocus amount).

Figure 13:
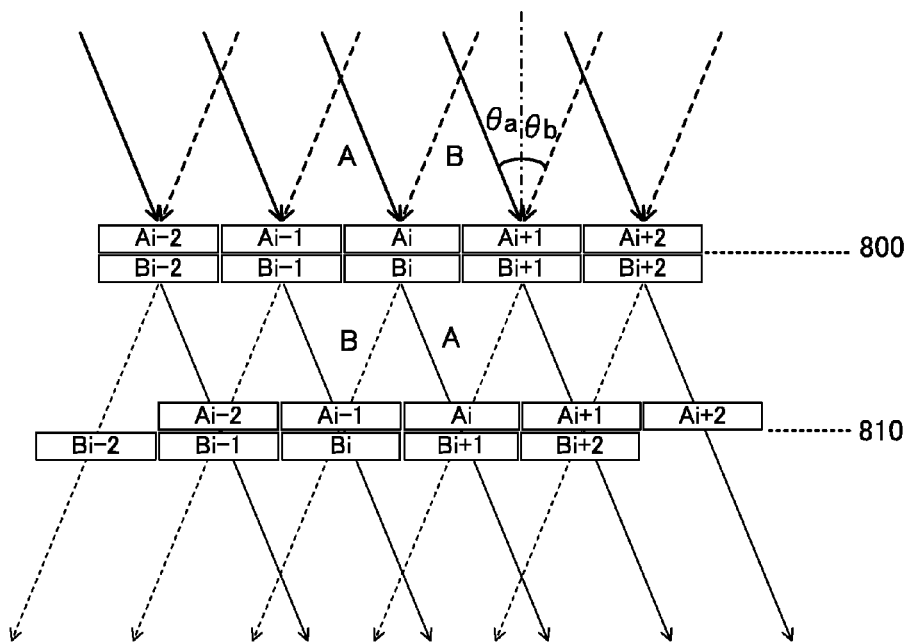
FIG. 13 is a diagram of explaining a refocus process in this embodiment.

FIG. 13 is a diagram of explaining the refocus process in this embodiment. FIG. 13 illustrates a schematic diagram of the refocus process by the first and second focus detection signals output from the image pickup element 107 in one-dimensional direction (column direction, i.e. horizontal direction).

In FIG. 13, the imaging plane 800 corresponds to the imaging plane 800 illustrated in FIGS. 5 and 6. In FIG. 13, symbol i denotes an integer, and schematically symbols Ai and Bi denote first and second focus detection signals respectively of an i-th pixel in a column direction of the image pickup element 107 disposed on the imaging plane 800. The first focus detection signal Ai is a light receiving signal output based on the light beam entering the i-th pixel at an angle θa (at a principal ray angle corresponding to the pupil partial region 501 in FIG. 5). The second focus detection signal Bi is a light receiving signal output based on the light beam entering the i-th pixel at an angle θb (at a principal ray angle corresponding to the pupil partial region 502 in FIG. 5).

Each of the first and second focus detection signals Ai and Bi has incident angle information as well as light intensity distribution information. Therefore, the first focus detection signal Ai is moved parallel (translated) up to a virtual imaging plane 810 at the angle θa and the second focus detection signal Bi is moved parallel (translated) up to the virtual imaging plane 810 at the angle θb, and then these signals are added to be able to generate the refocus signal on the virtual imaging plane 810. The parallel movement of the first focus detection signal Ai up to the virtual imaging plane 810 at the angle θa corresponds to a shift by +0.5 pixel in the column direction. The parallel movement of the second focus detection signal Bi up to the virtual imaging plane 810 at the angle θb corresponds to a shift by −0.5 pixel in the column direction. Therefore, when the first and second focus detection signals Ai and Bi are relatively shifted by +1 pixel and the first focus detection signal Ai and the corresponding second focus detection signal Bi+1 are added, the refocus signal on the virtual imaging plane 810 can be generated. In other words, when the first and second focus detection signals Ai and Bi are shifted by an integral multiple of the pixel pitch (i.e. integer shift is performed) and these signals are added, the shift addition signal (refocus signal) on each virtual imaging plane can be generated according to the integer shift amount.

The CPU 121 (second focus detection unit 121b) calculates the contrast evaluation value of the generated shift addition signal (refocus signal). Then, the CPU 121 estimates the MTF peak position of the imaging signal based on the calculated contrast evaluation value to perform the focus detection (second focus detection) by the refocus method.

Figure 14:
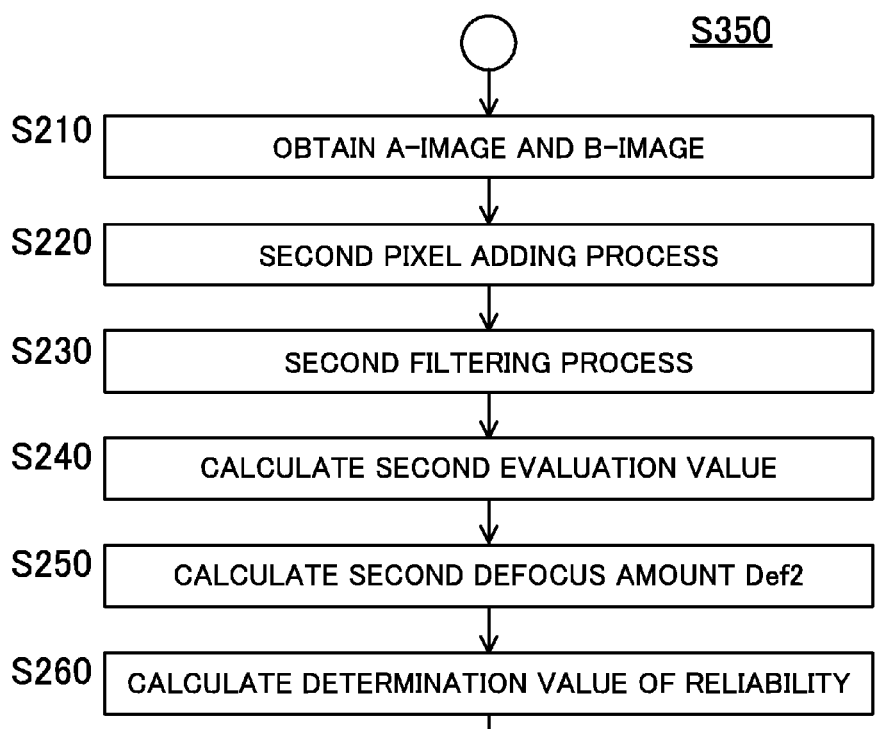
FIG. 14 is a flowchart of illustrating a focus detection process by a refocus method (second focus detection process) in this embodiment.

FIG. 14 is a flowchart of illustrating the focus detection process (second focus detection process) by the refocus method in this embodiment, and it corresponds to step S350 in FIG. 9 described below. Each step of FIG. 14 is performed mainly by the CPU 121 (second focus detection unit 121b) and the image processing circuit 125.

First of all, at step S210, the CPU 121 (second focus detection unit 121b) sets a focus detection region from among an effective pixel region of the image pickup element 107 to perform the focusing. Then, the CPU 121 and the image processing circuit 125 generate the first focus detection signal (A-image signal) based on a light receiving signal (output signal) of the first focus detection pixel included in the focus detection region. Furthermore, the CPU 121 and the image processing circuit 125 generate the second focus detection signal (B-image signal) based on a light receiving signal (output signal) of the second focus detection pixel included in the focus detection region.

Subsequently, at step S220, the image processing circuit 125 performs a three-pixel adding process in a column direction to suppress a signal data amount for each of the first and second focus detection signals. Furthermore, the image processing circuit 125 performs a Bayer (RGB) adding process to convert a color signal (RGB signals) to a luminance signal (Y signal). In this embodiment, these two adding processes are collectively referred to as a second pixel adding process. If necessary, at least one of the three-pixel adding process and the Bayer (RGB) adding process may be omitted.

Subsequently, at step S230, the CPU 121 and the image processing circuit 125 perform a second filtering process on the first and second focus detection signals. FIG. 9 is a diagram of explaining the second filtering process, and illustrates an example of a passband, with a dashed line, in the second filtering process of this embodiment. In this embodiment, the focus detection is performed by using the focus detection (second focus detection) by the refocus method from the small defocus state to a neighborhood of the best in-focus position. Therefore, the passband in the second filtering process includes a higher frequency band than the passband in the first filtering process (solid line or dashed-dotted line in FIG. 9). If necessary in performing the second filtering process, as indicated by a dotted line in FIG. 9, the passband of the second filtering process may be adjusted to be moved to a higher frequency band by using a Laplacian (second order differential) [1, −2, 1] filter that extracts an edge of an object signal. Extracting a high frequency component of the object to perform the second focus detection, the focus detection accuracy can be further improved.

Subsequently, at step S240, the CPU 121 and the image processing circuit 125 perform a shift process (second shift process) that relatively shifts the first and second focus detection signals on which the second filtering process have been performed in the pupil dividing direction. Then, the CPU 121 adds the processed signals to generate a shift addition signal (refocus signal). Furthermore, the CPU 121 calculates a contrast evaluation value (second evaluation value) based on the generated shift addition signal.

In this embodiment, k-th first and second focus detection signals on which the second filtering process have been performed are denoted by A(k) and B(k) respectively, a range of the number k corresponding to the focus detection region is denoted by W, a shift amount by the second shift process is denoted by $s_2$, and a shift range of the shift amount $s_2$ is denoted by Γ2. In this case, a contrast evaluation value RFCON (second evaluation value) is represented as the following expression (2).

$$RFCON(s_2) = \max_{k \in W}|A(k) + B(k - s_2)|, s_2 \in \Gamma 2 \qquad (2)$$

The CPU 121 performs the shift process (second shift process) by the shift amount $s_2$ such that the k-th first focus detection signal A(k) and the $(K-s_2)$-th second focus detection signal $B(K-s_2)$ correspond to each other, and adds the signal A(K) and the signal $B(K-s_2)$ to generate a shift addition signal. Then, the CPU 121 calculates absolute values of the generated shift addition signals and a maximized value within the range W corresponding to the focus detection region to calculate the contrast evaluation value $RFCON(s_2)$ (second evaluation value). If necessary, the contrast evaluation value (second evaluation value) calculated for each row may be added over a plurality of rows for each shift amount.

Subsequently, at step S250, the CPU 121 performs a sub-pixel calculation for the contrast evaluation value (second evaluation value) to calculate a real-valued shift amount which indicates a maximum contrast evaluation value to obtain a peak shift amount p2. Then, the CPU 121 multiplies the peak shift amount p2 by a conversion coefficient K2 (second conversion coefficient) according to the image height of the focus detection region, the F-number of the imaging lens (imaging optical system), and the exit pupil distance to detect (calculate) a second defocus amount Def2. In this embodiment, the conversion coefficients K1 and K2 may be set to the same value.

Figure 17:
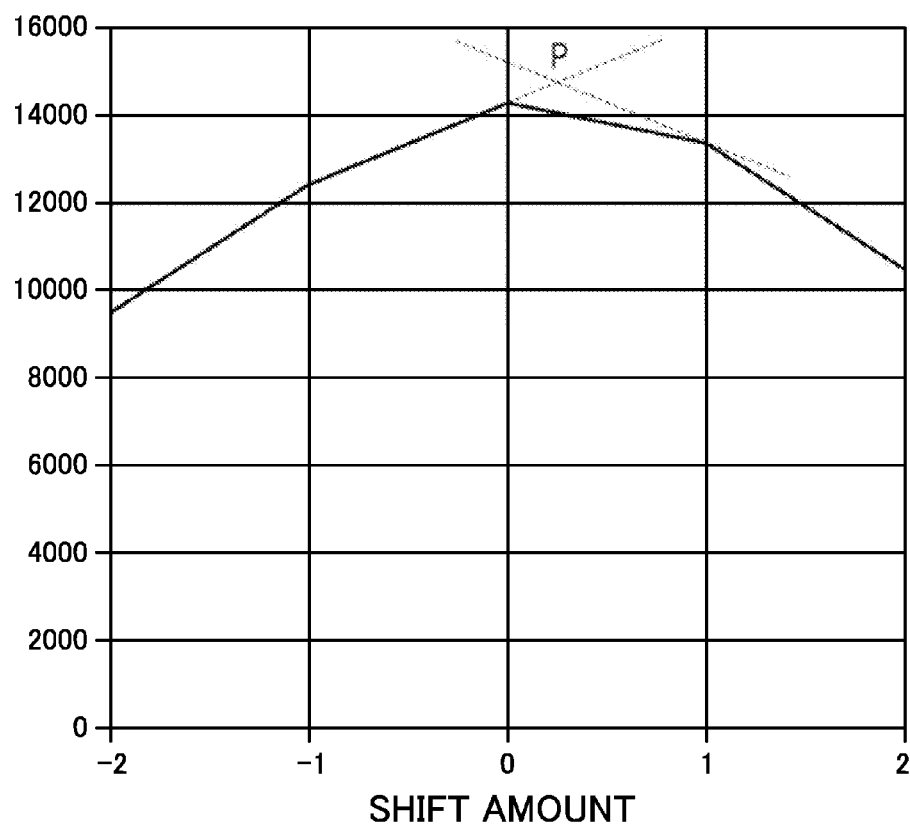
FIG. 17 is an example of a second evaluation value in this embodiment.

Subsequently, at step S260, the CPU 121 calculates a determination value to perform a reliability determination of the second defocus amount Def2 calculated at step S250. The determination value is a value to determine whether the second defocus amount Def2 is within a refocusable range, and it is for example generated based on a steepness of an angle shape as illustrated in FIG. 17 or based on a difference value between the maximum value and the minimum value. The details of the reliability determination will be described below.

As described above, in this embodiment, the CPU 121 performs the focus detection (second focus detection) by the refocus method to perform the second filtering process and the second shift process on each of the first and second focus detection signals to generate the shift addition signal. Then, the CPU 121 calculates the contrast evaluation value based on the shift addition signal, and detects (calculates) the second defocus amount Def2 based on the contrast evaluation value.

In the image pickup element 107 of this embodiment, as illustrated in FIGS. 4 and 5, the added value (synthesized value) of the light beam which is received by the first focus detection pixel and the light beam which is received by the second focus detection pixel is a light beam which is received by the imaging pixel. When performing the focus detection (second focus detection) by the refocus method, the CPU 121 performs the focus detection based on the shift addition signal (refocus signal) of the first and second focus detection signals differently from the focus detection (first focus detection) by the phase-difference detection method. Therefore, the light beam corresponding to the shift addition signal which is used for the second focus detection and the light beam corresponding to the imaging signal approximately coincide with each other. Therefore, the influence on the shift addition signal caused by each aberration (such as spherical aberration, astigmatism, and coma aberration) of the imaging optical system is approximately the same as the influence on the imaging signal. Accordingly, the in-focus position calculated by the focus detection (second focus detection) by the refocus method (i.e. position where the second defocus amount Def2 is zero) and the best in-focus position of the imaging signal (i.e. position of the imaging signal where MTF of the imaging signal is peaked) approximately coincide with each other. As described above, the accuracy of the focus detection (second focus detection) by the refocus method is higher than that of the focus detection (first focus detection) by the phase-difference detection method.

Figure 15:
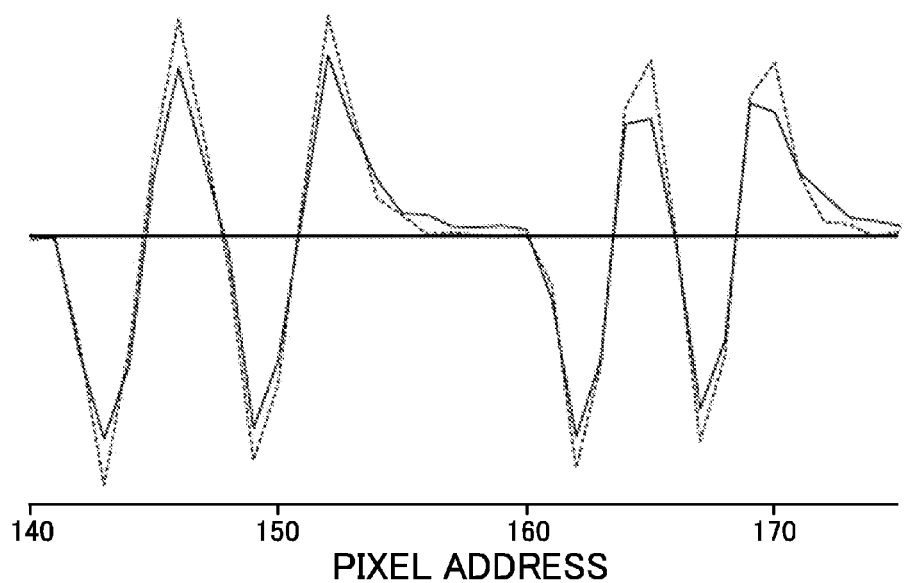
FIG. 15 is an example of the first focus detection signal and the second focus detection signal on which a second filtering process has been performed.
Figure 16:
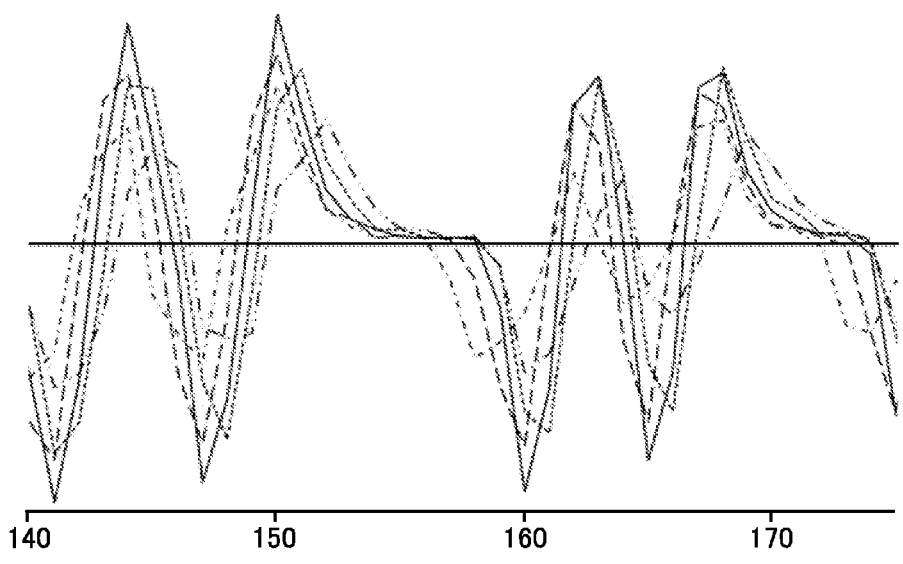
FIG. 16 is an example of a shift addition signal that is obtained by performing a shift addition of the first focus detection signal and the second focus detection signal on which the second filtering process has been performed.

FIG. 15 is an example of the first and second focus detection signals on which the second filtering process have been performed in this embodiment. FIG. 15 illustrates the first focus detection signal (dashed line) and the second focus detection signal (solid line) after the second filtering process is performed on the first focus detection signal (dashed line) and the second focus detection signal (solid line) illustrated in FIG. 10, respectively. FIG. 16 is an example of the shift addition signals on which the shift addition of the first and second focus detection signals after the second filtering process have been performed. FIG. 16 illustrates the shift addition signals (refocus signals) obtained by shifting the first focus detection signal (dashed line) and the second focus detection signal (solid line) after the second filtering process relatively by −2,−1, 0, 1, and 2 pixels and adding them. According to the change of the shift amount, the peak value of the shift addition signal varies. FIG. 17 is an example of the contrast evaluation value (second evaluation value) calculated based on each shift addition signal.

FIG. 12 illustrates an example of the second defocus amount Def2 (solid line) obtained by the focus detection (second focus detection) by the refocus method. As illustrated in FIG. 12, at the best in-focus position where the set defocus amount is zero, the second defocus amount Def2 obtained by the second focus detection is smaller (i.e. closer to the set defocus amount of zero) than the first defocus amount Def1 obtained by the first focus detection. Therefore, the focus detection can be performed with higher accuracy. As described above, in this embodiment, at the neighborhood of the best in-focus position of the imaging optical system where the set defocus amount is zero, the accuracy of the focus detection (second focus detection) by the refocus method is higher than that of the focus detection (first focus detection) by the phase-difference detection method.

[Refocusable Range]

On the other hand, since the refocusable range is limited, a range of the defocus amount in which highly-accurate focus detection can be performed by using the focus detection by the refocus method (second focus detection) is limited.

Figure 18:
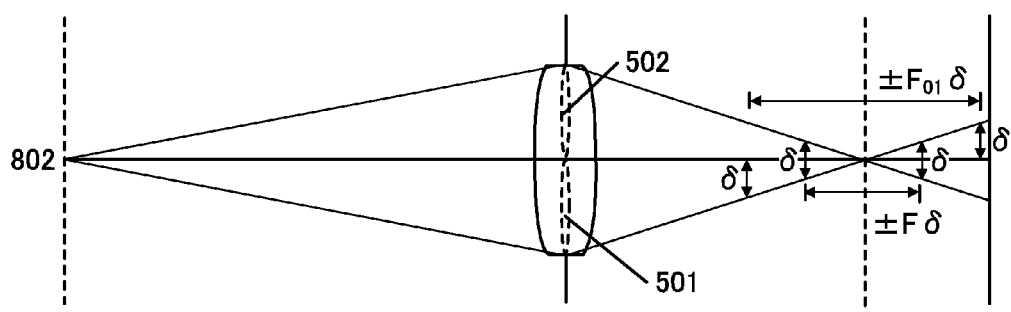
FIG. 18 is a diagram of explaining a refocusable range in this embodiment.

FIG. 18 is a diagram of explaining the refocusable range in this embodiment. A depth of field in an aperture value F is represented as ±Fδ, where δ is a permissible circle of confusion, F is the aperture value (F-number) of the imaging optical system. On the other hand, an effective aperture value $F_{01}$ ($F_{02}$) in a horizontal direction of the narrowed pupil partial region 501 (502) which has been divided into $N_H \times N_V (2 \times 1)$ is $F_{01} = N_H F$, and it is dark. An effective depth of field for each first focus detection signal (second focus detection signal) is $\pm N_H F \delta$, and it is $N_H$ times deeper and an in-focus range is $N_H$ times wider. Within a range of the effective depth of field $\pm N_H F \delta$, a focused object image is obtained for each first focus detection signal (second focus detection signal). Therefore, according to the refocus process that performs a parallel movement of the first focus detection signal (second focus detection signal) along the angle θa (θb) of the principal ray illustrated in FIG. 13, the in-focus position can be readjusted (refocused) after shooting an image. Thus, the defocus amount d from the imaging plane in which the in-focus position is capable of readjusting (refocusable) after shooting the image is limited, and the refocusable range of the defocus amount d is roughly represented by the following expression (3).

$$|d| \leq N_H F \delta \quad (3)$$

The permissible circle of confusion δ is for example defined as $\delta = 2\Delta X$ (inverse of a Nyquist frequency $1/(2\Delta X)$ of a pixel period $\Delta X$). In necessary, an inverse of a Nyquist frequency $1/(2\Delta X_{AF})$ of a period $\Delta X_{AF}(=6X$: when adding 6 pixels) of the first focus detection signal (second focus detection signal) after the second pixel adding process can be used as the permissible circle of confusion $\delta = 2\Delta X_{AF}$.

The range of the defocus amount in which the focus detection (second focus detection) by the refocus method can be performed with high accuracy is roughly limited to the range of expression (3). A defocus range in which highly-accurate detection can be performed by the second focus detection is within a range not greater than a defocus range in which the focus detection (first focus detection) by the phase-difference detection method can be performed. As illustrated in FIG. 6, the relative shift amount between the first and second focus detection signals in the horizontal direction is roughly proportional to the defocus amount.

In this embodiment, the image pickup apparatus 100 performs the first focus detection within a range from the large defocus state to the small defocus state of the imaging optical system, and it performs the second focus detection within a range from the small defocus state to the neighborhood of the in-focus position of the imaging optical system. Therefore, it is preferred that the passband of the second filtering process in the second focus detection contains a higher frequency band than the passband of the first filtering process in the first focus detection. More preferably, the number of the added pixels of the second pixel adding process in the second focus detection is not greater than that of the first pixel adding process in the first focus detection.

As described above, when the aperture value of the imaging optical system is not greater than a predetermined aperture value, the accuracy of the focus detection (first focus detection) by the phase-difference detection method may be decreased. Therefore, if necessary, it is preferred that the second defocus amount Def2 is detected by the focus detection (second focus detection) by the refocus method, in addition to the focus detection (first focus detection) by the phase-difference detection method, to perform highly-accurate focus detection.

[Usage of Result of Reliability Determination]

When a refocus range is not included in the refocusable range described above, the reliability of the second defocus amount Def2 obtained by the second focus detection is decreased. Therefore, as described with reference to step S260 in FIG. 14, the CPU 121 (control unit 121c) performs the reliability determination based on a steepness of the angle shape as illustrated in FIG. 17 or based on a difference value between the maximum value and the minimum value.

Figure 19:
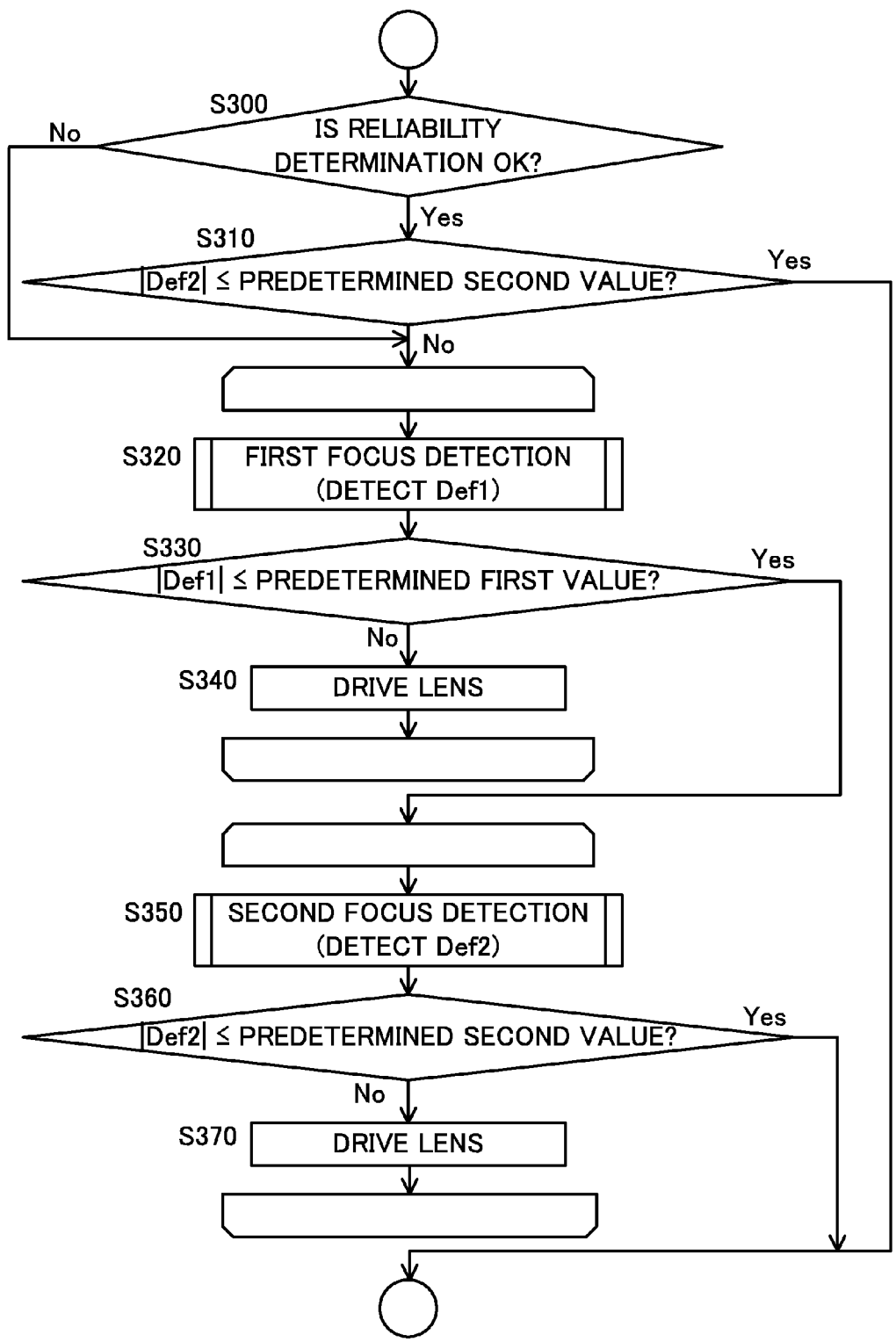
FIG. 19 is a flowchart of illustrating an AF operation in this embodiment.

FIG. 19 is a flowchart of illustrating an AF operation of the image pickup apparatus 100 (camera). Each step of FIG. 19 is performed mainly by the CPU 121 (first focus detection unit 121a, second focus detection unit 121b, and control unit 121c), the focus driving circuit 126, and the focus actuator 114. In this embodiment, the CPU 121 performs focus control with reference to the second defocus amount Def2 prior to the first defocus amount Def1 when the start of the AF operation is instructed via the operating unit (operating member 132), i.e. when the instruction unit 121d gives an instruction of the focus control in response to an instruction by a user.

First of all, at step S300, the CPU 121 (control unit 121c) determines whether the second defocus amount Def2 is reliable, i.e. whether a reliability of the second defocus amount Def2 is lower than a predetermined determination value. For example, the control unit 121c determines that the second defocus amount Def2 is reliable when the second defocus amount Def2 is within the refocusable range. When the control unit 121c determines that the reliability of the second defocus amount Def2 is low (i.e. the reliability is lower than the predetermined determination value), the flow proceeds to step S320. On the other hand, when the control unit 121c determines that the reliability of the second defocus amount Def2 is high (i.e. the reliability is higher than the predetermined determination value), the flow proceeds to step S310.

At step S310, the CPU 121 (control unit 121c) determines whether the second defocus amount Def2 is not greater than a predetermined value (i.e. not greater than a predetermined second value). In other words, the CPU 121 performs an in-focus determination based on the second defocus amount Def2. The predetermined second value is an absolute value of a displacement (shift amount) from the in-focus position where the image pickup apparatus 100 determines that the position of the third lens unit 105 is in an in-focus state. Determining that the second defocus amount Def2 is not greater than the predetermined second value means that the image pickup apparatus 100 is sufficiently focused on an object (i.e. in the in-focus state). Accordingly, when the second defocus amount Def2 is not greater than the predetermined second value, this flow is finished. On the other hand, when the second defocus amount Def2 exceeds the predetermined second value, the flow proceed to step S320.

At step S320, the CPU 121 (first focus detection unit 121a) performs the focus detection (first focus detection) by the phase-difference detection method described with reference to FIG. 7 to detect the first defocus amount Def1. Subsequently, at step S330, the CPU 121 (control unit 121c) determines whether the first defocus amount Def1 detected at step S320 is not greater than a predetermined value (predetermined first value). The predetermined first value is substantially below a refocus limitation (within the refocusable range), and it is an absolute value of a displacement (shift amount) from the in-focus position in which the second defocus amount Def2 is reliable.

When the first defocus amount Def1 is greater than the predetermined first value at step S330, the flow proceeds to step S340. At step S340, the CPU 121 controls the focus driving circuit 126 and the focus actuator 114 to drive the third lens unit 105 (focus lens unit), i.e. to perform a lens drive. This lens drive is performed until the first defocus amount Def1 is not greater than the predetermined first value.

As described above, the control unit 121c perform focus control based on the first defocus amount Def1 when the second defocus amount is not reliable or the second defocus amount Def2 is greater than the predetermined second value (i.e. the second defocus amount Def2 does not satisfy a predetermined condition). In this case, the control unit 121c performs the focus control based on the first defocus amount Def1 when the first defocus amount Def1 is greater than the predetermined first value.

On the other hand, when the CPU 121 determines that the first defocus amount Def1 is not greater than the predetermined first value at step S330, the flow proceeds to step S350. At step S350, the CPU 121 (second focus detection unit 121b) performs the focus detection (second focus detection) by the refocus method described with reference to FIG. 14 to detect the second defocus amount Def2. In other words, when the first defocus amount Def1 is not greater than the predetermined first value, the second focus detection unit 121b newly calculates the second defocus amount Def2 (updated second defocus amount).

Subsequently, at step S360, the CPU 121 (control unit 121c) determines whether the second defocus amount Def2 detected at step S350 is not greater than the predetermined value (predetermined second value). When the second defocus amount Def2 is greater than the predetermined second value at step S360, the flow proceeds to step S370. At step S370, the CPU 121 (control unit 121c) controls the focus driving circuit 126 and the focus actuator 114 (performs the focus control) to drive the third lens unit 105 (focus lens unit), i.e. to perform the lens drive. This lens drive is performed until the second defocus amount Def2 is not greater than the predetermined second value. On the other hand, when the second defocus amount Def2 is not greater than the predetermined second value at step S360, the control unit 121c determines that the image pickup apparatus 100 (third lens unit 105) is in the in-focus state and this flow is finished.

As described above, the plurality of pixels of the image pickup element 107 includes the first pixel (first focus detection pixel) and the second pixel (second focus detection pixel). The first focus detection unit 121a (first calculation unit) calculates, as a first evaluation value, the first defocus amount based on the correlation amount between the first focus detection signal (first signal) output from the first pixel and the second focus detection signal (second signal) output from the second pixel. The second focus detection unit 121b (second calculation unit) calculates, as a second evaluation value, the second defocus amount based on the contrast evaluation value of the addition signal (synthesized signal) of the first and second focus detection signals. The first calculation unit performs the first filtering process on the first and second focus detection signals to allow passage of the first frequency band to calculate the correlation amount. The second calculation unit performs the second filtering process on the first and second focus detection signals to allow passage of the second frequency band to calculate the contrast evaluation value. In this embodiment, the second frequency band includes a higher band than the first frequency band.

As described above, the second focus detection performs the filtering process with a high frequency band compared to the first focus detection. Therefore, when the set defocus amount is zero, the second defocus amount Def2 determined by the second focus detection is less than the first defocus amount Def1 determined by the first focus detection. Accordingly, the CPU 121 refers to the latest second defocus amount Def2 previously obtained at steps S300 and S310, and thus an unnecessary lens drive can be avoided when the third lens unit 103 is previously in the in-focus position. The flowchart of FIG. 19 illustrates the first and second focus detections sequentially, but this embodiment is not limited to this. Even in the configuration where results (detection signals) of the first and second focus detection are simultaneously output, the same effect can be obtained by referring to the second defocus amount Def2 prior to the first defocus amount Def1.

As described above, the image pickup apparatus of this embodiment is capable of reducing an unnecessary drive considering the displacement caused by the difference between the filtering bands of the first focus detection unit that obtains the correlation value and the second focus detection unit that obtains the contrast evaluation value. According to this embodiment, a control apparatus and a control method that are capable of performing high-speed and high-accuracy focus control can be provided.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083337, filed on Apr. 15, 2014, which is hereby incorporated by reference wherein in its entirety.

What is claimed is:

1. A control apparatus comprising:
a first calculation unit configured to calculate a first defocus amount by a phase-difference detection method using a first signal and a second signal;
a second calculation unit configured to calculate a second defocus amount based on a contrast evaluation value of a combined signal;
an instruction unit configured to give an instruction of focus control; and
a control unit configured to perform the focus control in response to the instruction of the focus control by the instruction unit,
wherein the combined signal is a signal obtained by relatively shifting phases of the first and second signals and combining the first and second signals, and
wherein the control unit refers to the second defocus amount prior to the first defocus amount in the focus control.

2. The control apparatus according to claim 1,
wherein the control unit refers to the first defocus amount when the second defocus amount satisfies a predetermined condition in the focus control.

3. The control apparatus according to claim 1,
wherein the first and second signals are signals output from an image pickup element, and
wherein the image pickup element includes a plurality of pixel portions that shares one microlens and that receive light beams passing through regions different from each other in a pupil of an imaging optical system.

4. The control apparatus according to claim 1,
wherein the first and second calculation units are configured on the same circuit board.

5. The control apparatus according to claim 2,
wherein the predetermined condition includes a determination that the second defocus amount is not reliable.

6. The control apparatus according to claim 2,
wherein the predetermined condition includes a determination that the second defocus amount is not within a refocusable range.

7. The control apparatus according to claim 2,
wherein the predetermined condition includes a determination that the second defocus amount is greater than a predetermined second value.

8. The control apparatus according to claim 1,
wherein the second calculation unit calculates the second defocus amount when the first defocus amount is not greater than a predetermined first value.

9. The control apparatus according to claim 8,
wherein the control unit performs the focus control based on the first defocus amount when the first defocus amount is greater than the predetermined first value.

10. The control apparatus according to claim 8,
wherein the control unit determines that a focus state is in an in-focus state when the calculated second defocus amount is not greater than the predetermined second value, and
wherein the control unit performs the focus control based on the second defocus amount when the calculated second defocus amount is greater than the predetermined second value.

11. The control apparatus according to claim 1,
wherein the first calculation unit calculates the first defocus amount based on a correlation amount between the first signal, as a first focus detection signal, output from a first pixel portion and the second signal, as a second focus detection signal, output from a second pixel portion.

12. The control apparatus according to claim 11,
wherein the second calculation unit calculates the second defocus amount based on the contrast evaluation value, as a second evaluation value, of the combined signal of the first and second focus detection signals.

13. The control apparatus according to claim 12,
wherein the first calculation unit performs a first filtering process that allows passage of a first frequency band on the first and second focus detection signals to calculate the correlation amount, and
wherein the second calculation unit performs a second filtering process that allows passage of a second frequency band on the first and second focus detection signals to calculate the contrast evaluation value.

14. The control apparatus according to claim 13, wherein the second frequency band includes a band higher than the first frequency band.

15. The control apparatus according to claim 12, wherein the combined signal is a refocus signal that is obtained by relatively shifting the first and second focus detection signals and combining the first and second detection signals.

16. A control method for an apparatus comprising the steps of:
- calculating a first defocus amount by a phase-difference detection method using a first signal and a second signal;
- calculating a second defocus amount based on a contrast evaluation value of a combined signal;
- giving an instruction of focus control; and
- performing the focus control in response to the instruction of the focus control,
- wherein the combined signal is a signal obtained by relatively shifting phases of the first and second signals and combining the first and second signals, and
- wherein the focus control is performed by referring to the second defocus amount prior to the first defocus amount.

* * * * *